Aug. 23, 1938.   H. C. DIESERUD   2,127,642
CHANGE MAKING ATTACHMENT FOR CASH REGISTERS
Filed June 17, 1932   10 Sheets-Sheet 1

Inventor
Heige C. Dieserud
By
 Earl Beust
His Attorney

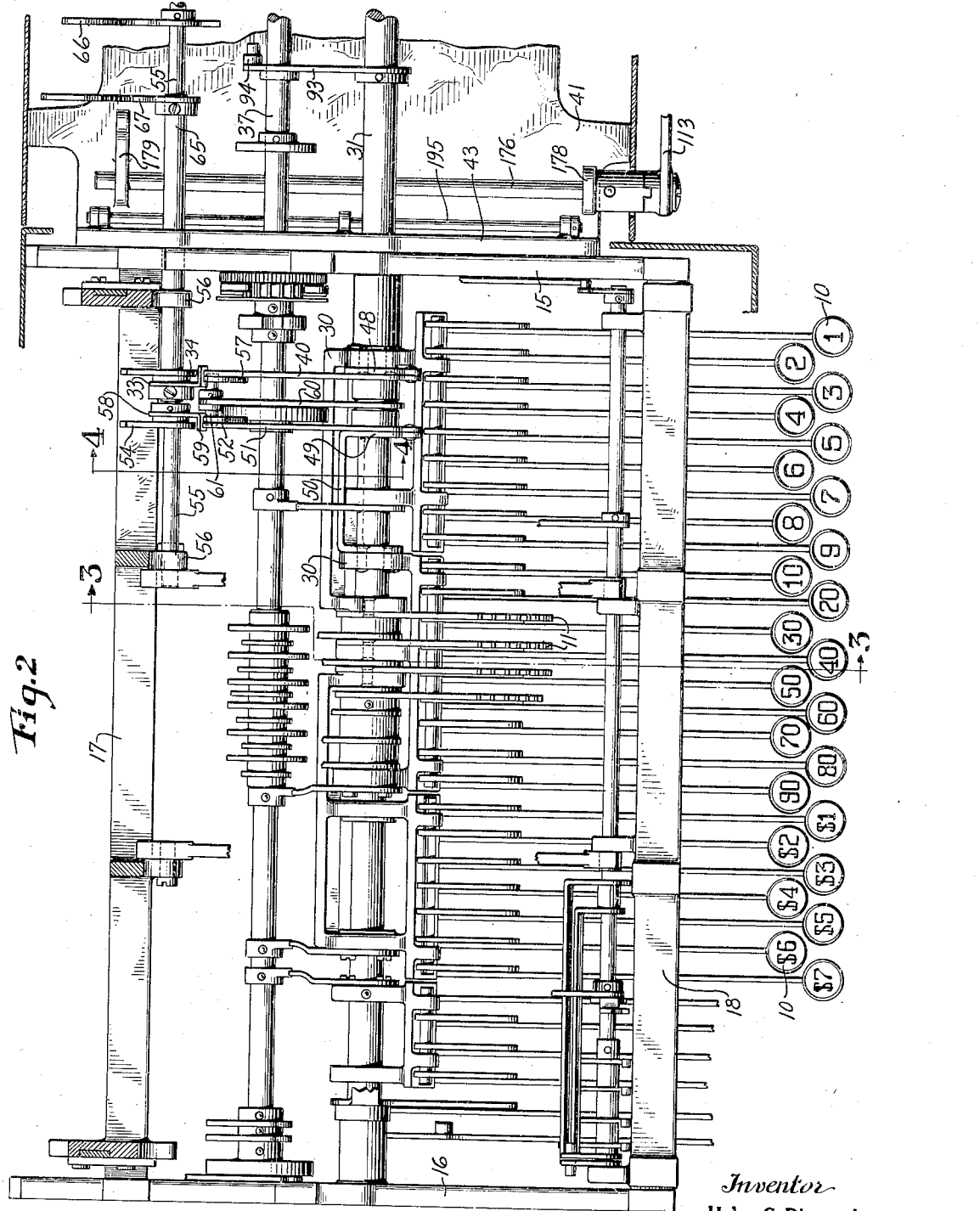

Aug. 23, 1938.   H. C. DIESERUD   2,127,642
CHANGE MAKING ATTACHMENT FOR CASH REGISTERS
Filed June 17, 1932   10 Sheets-Sheet 3
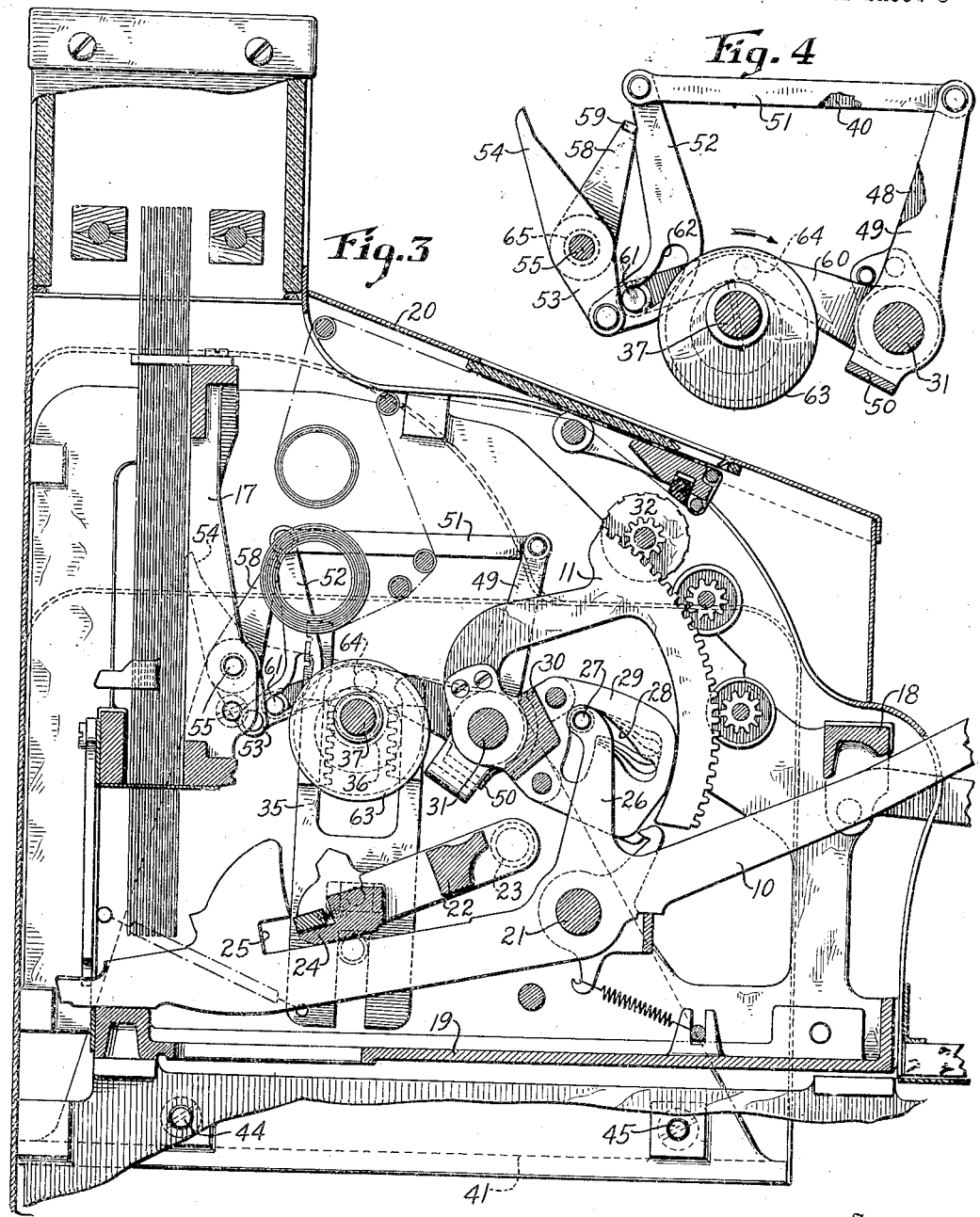
Inventor
Helge C. Dieserud
By
His Attorney Aug. 23, 1938.   H. C. DIESERUD   2,127,642
CHANGE MAKING ATTACHMENT FOR CASH REGISTERS
Filed June 17, 1932   10 Sheets-Sheet 4
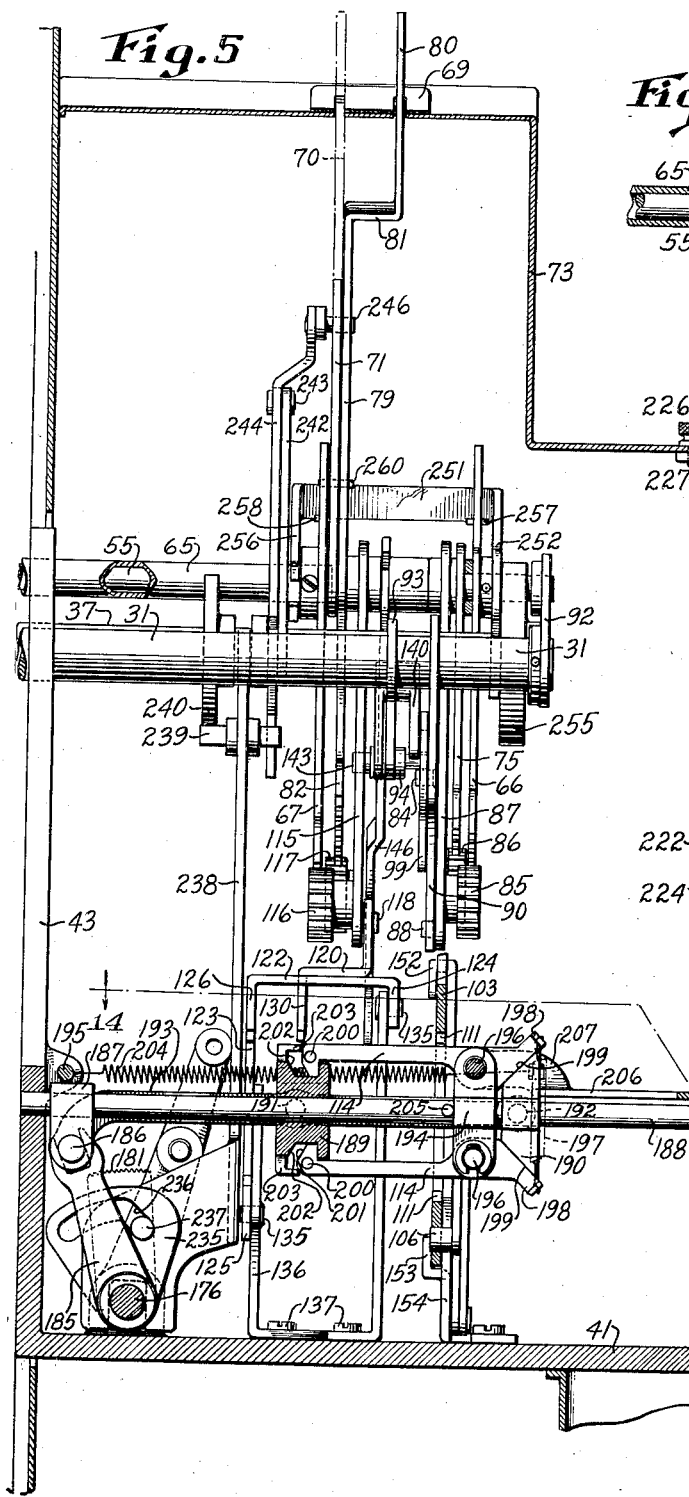
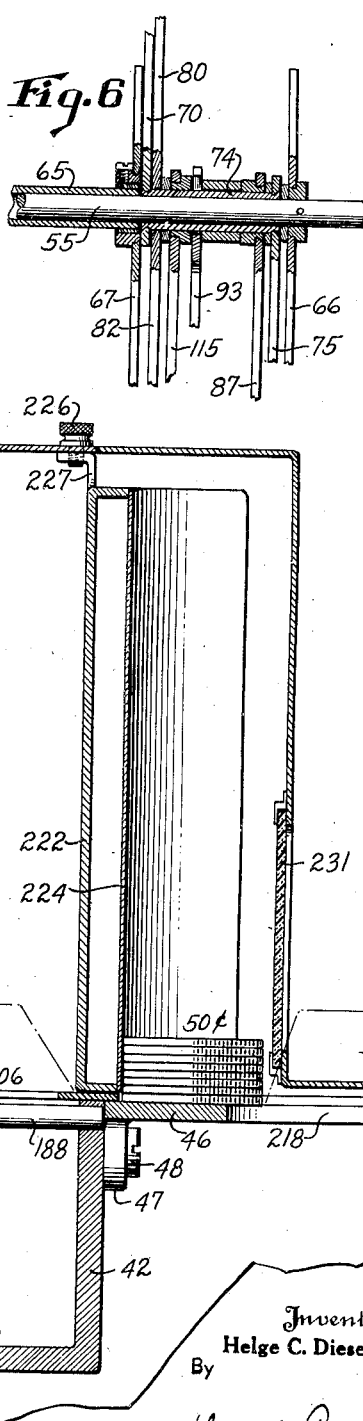
Inventor
Helge C. Dieserud
By
His Attorney Aug. 23, 1938.  H. C. DIESERUD  2,127,642
CHANGE MAKING ATTACHMENT FOR CASH REGISTERS
Filed June 17, 1932   10 Sheets-Sheet 5
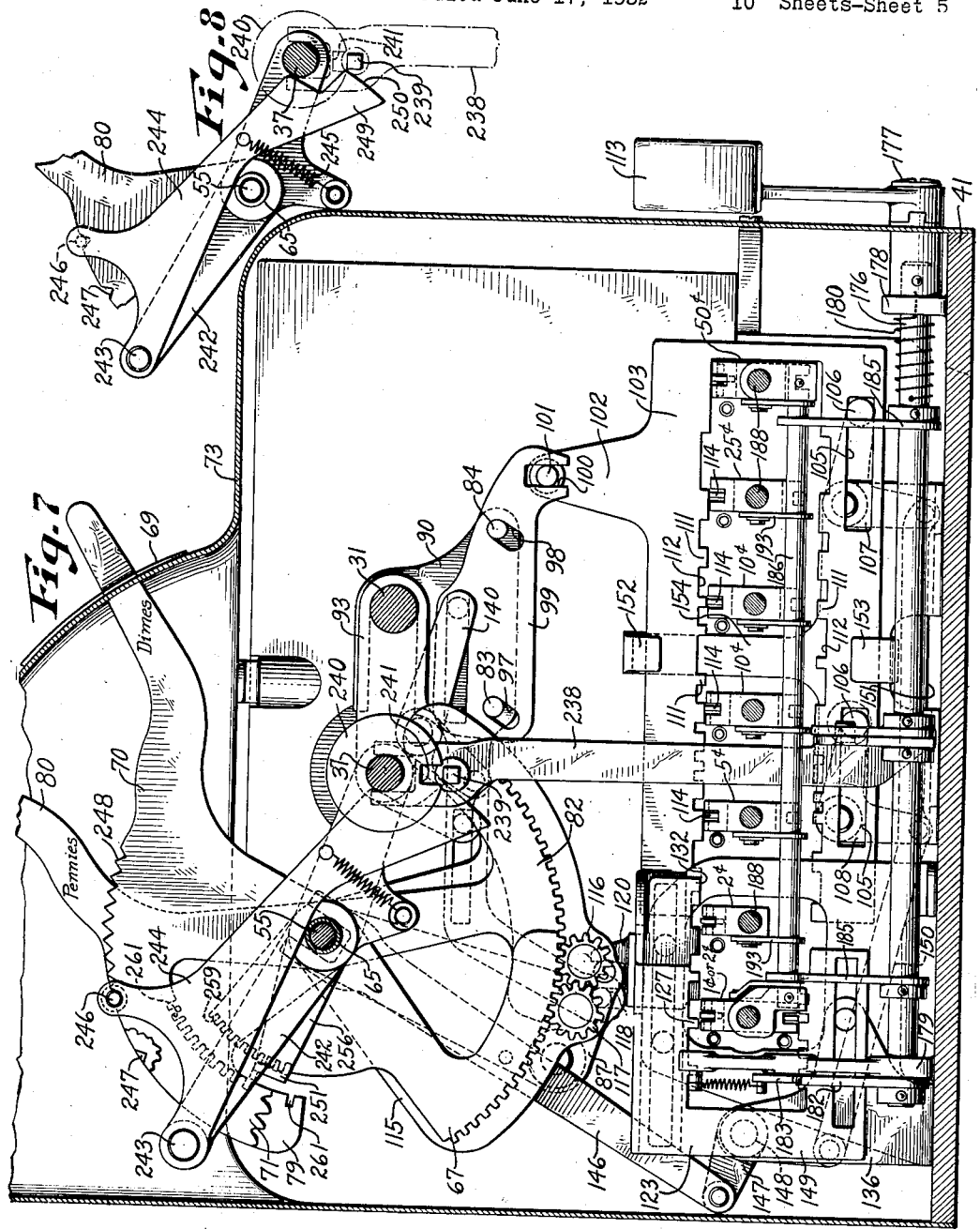
Inventor
Helge C. Dieserud
By
His Attorney Aug. 23, 1938.   H. C. DIESERUD   2,127,642
CHANGE MAKING ATTACHMENT FOR CASH REGISTERS
Filed June 17, 1932   10 Sheets-Sheet 6
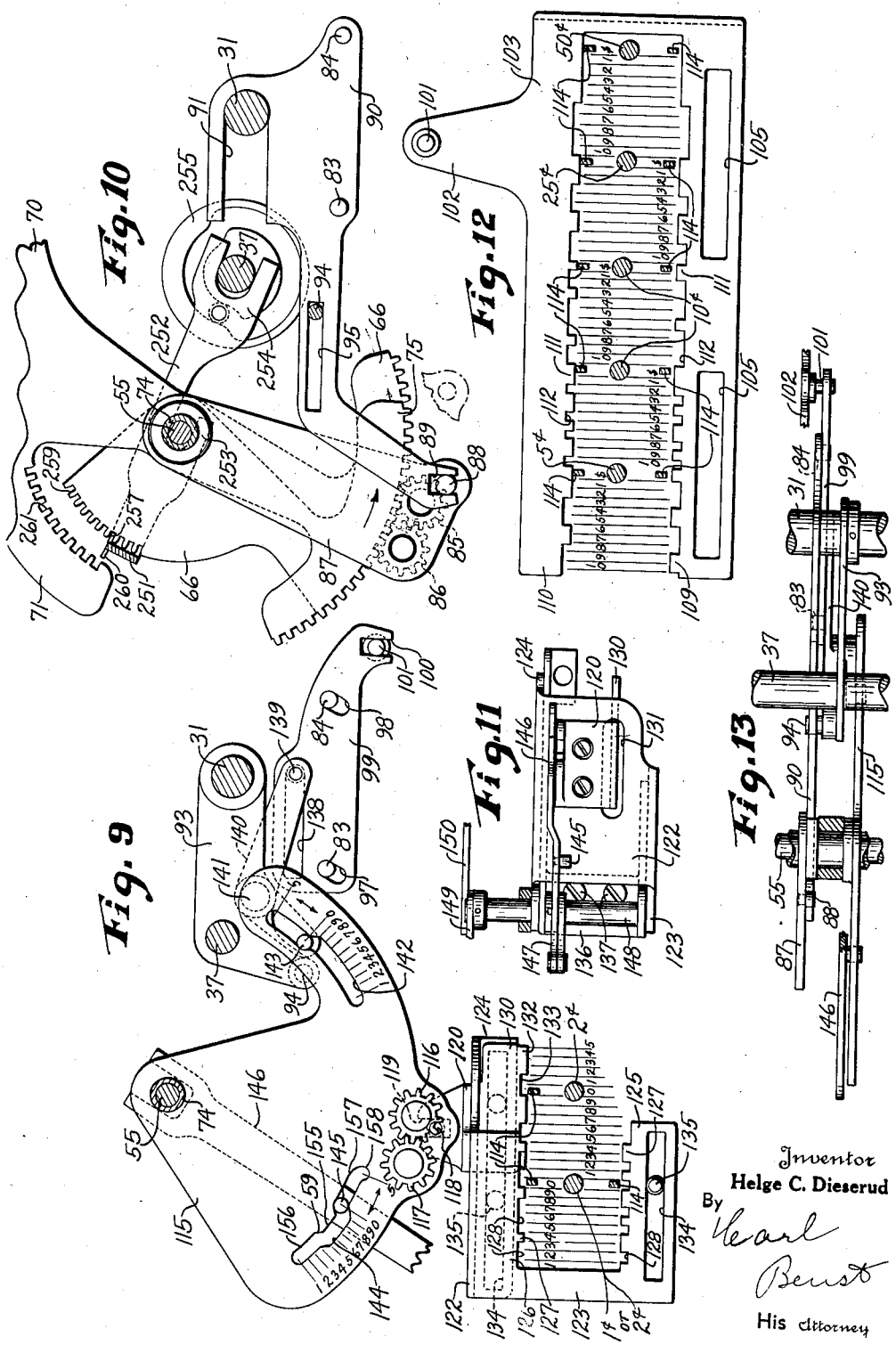
Inventor
Helge C. Dieserud
By
Karl Benst
His Attorney

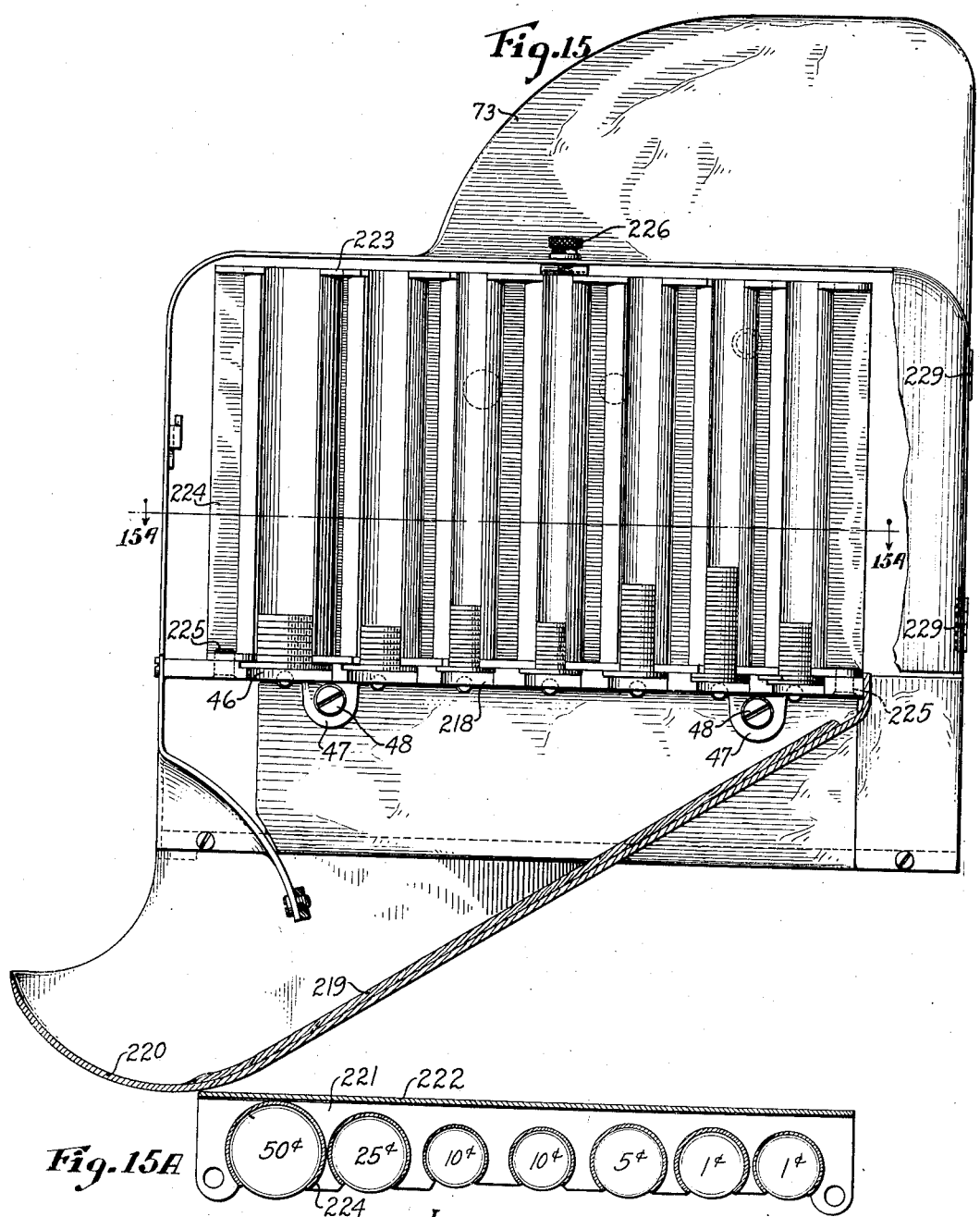

Aug. 23, 1938.   H. C. DIESERUD   2,127,642
CHANGE MAKING ATTACHMENT FOR CASH REGISTERS
Filed June 17, 1932   10 Sheets-Sheet 9
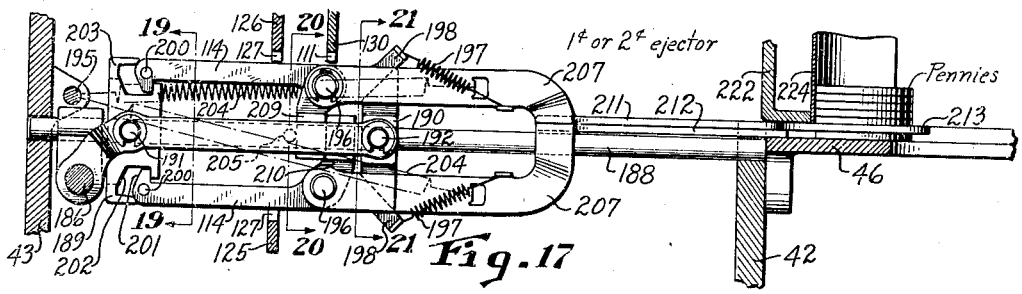
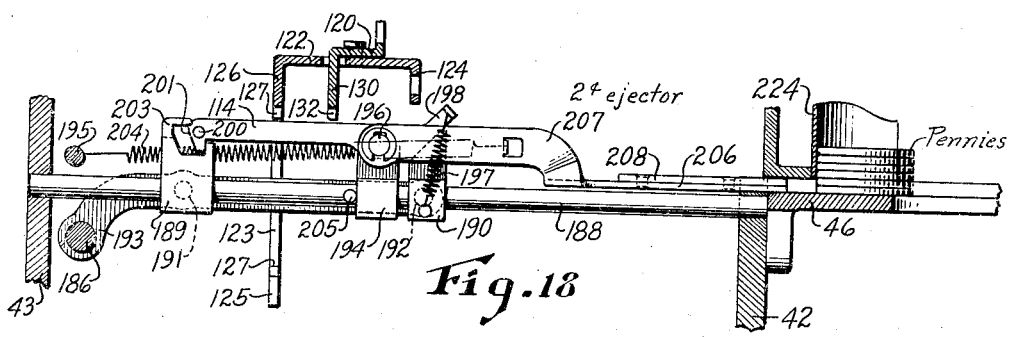
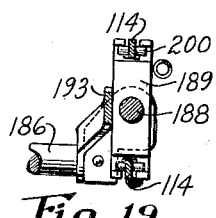
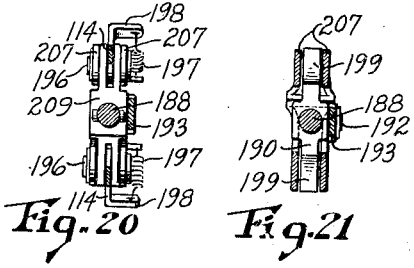
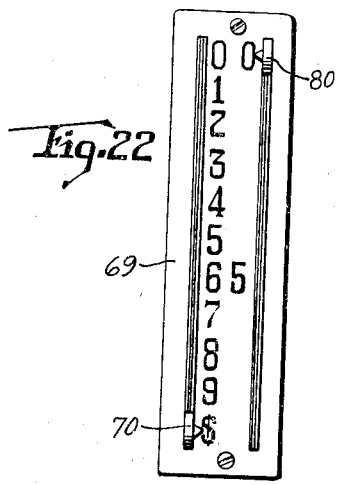
Inventor
Helge C. Dieserud
By
His Attorney Aug. 23, 1938.    H. C. DIESERUD    2,127,642
CHANGE MAKING ATTACHMENT FOR CASH REGISTERS
Filed June 17, 1932    10 Sheets-Sheet 10

Inventor
Helge C. Dieserud
By
Carl Beust
His Attorney

Patented Aug. 23, 1938

2,127,642

UNITED STATES PATENT OFFICE 2,127,642

CHANGE MAKING ATTACHMENT FOR CASH REGISTERS

Helge C. Dieserud, Montclair, N. J., assignor to The National Cash Register Company, Dayton, Ohio, a corporation of Maryland Application June 17, 1932, Serial No. 617,745

30 Claims. (Cl. 133—2)

The present invention appertains to the art of money handling and comprises a machine for mechanically delivering money in predetermined amounts, or for automatically computing the difference between two amounts so as to deliver money equivalent to such difference, as, for instance, the change between amounts of money tendered, and amounts of sale or purchase, all commonly occurring in the operation of many businesses.

From the foregoing it will be apparent that the machine is of wide adaptability, an especial object in view having been to provide a construction wherein the advantageous operation of what is ordinarily known as a change maker may be obtained, while at other times, to take care of certain frequent business usage, the same machine may be employed for the mere delivery of money in selected amounts irrespective of the change making action above referred to.

In providing a machine of the foregoing characteristics it has been an object to maintain simplicity of construction and operation so that relatively few parts are required and little power is necessary to effect the results desired. A further object has been to provide a simple form of mechanism whereby the smallest number of coins are selected or issued in the making of change of any desired amounts.

It is an object of the present invention to always automatically issue the smallest number of coins in making change, for example, issuing a quarter instead of 2 dimes and a nickel when 25 cents change is to be issued.

While the devices embracing the present invention, as described in detail hereinafter, may be used alone as a change maker, it is contemplated to associate therewith any well known type of registering or indicating devices, many of which are in common use today as cash registers, adding machines and similar accounting devices. The particular combination of mechanisms adopted will depend on the particular uses or purposes to which a machine of this class may be put.

For the purpose of exemplifying one use of the present invention it has been shown in connection with a type of cash register well known in the art and shown in the United States patent to Frederick L. Fuller, No. 1,742,701 dated Jan. 7, 1930. As will be more clearly apparent as the description progresses, however, the improvements are capable of being applied to or embodied in a number of different forms of cash registers and accounting machines without departing from the spirit of the invention.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Fig. 2 is a top plan view of the cash register to which the present improvements have been applied, the cabinet covers having been removed to more clearly illustrate the arrangement of the cash register keys, associated differential mechanisms, and some of the connections between the cash register and the coin issuing attachment.

Fig. 3 is a transverse sectional view of the cash register taken on the line 3—3 of Fig. 2 and shows the main and secondary differential mechanisms associated with a certain group of keys.

Fig. 4 is a detail view in side elevation taken on the line 4—4 of Fig. 2 illustrating the secondary differential mechanism associated with a certain bank of cash register keys.

Fig. 5 is a front elevation, partly in section, of the coin issuing attachment showing particularly one of the ejecting units and the differential mechanism for adjusting the change control plates to the desired positions.

Fig. 6 is a sectional view showing the arrangement and connections between the various members comprising the control plate adjusting device.

Fig. 7 is a view in side elevation showing the inter-relationship between the amount tendered setting levers and the associated coin control plates, together with the various coin ejecting units. This view also shows the change issuing lever and its connections for operating the various ejecting units which are selected for operation.

Fig. 8 is a detail view showing particularly the aligning mechanism for the various setting levers and the interlocks between the main operating shaft of the cash register, the setting levers and the change issuing lever.

Fig. 9 is a view in side elevation showing particularly the differential mechanism associated with the pennies controlling devices and some special devices which operate to effect a negative transfer under certain conditions.

Fig. 10 is a view in side elevation of the differential devices utilized for the purpose of differentially adjusting the control plate which determines the issuance of silver and nickel coins.

Fig. 11 is a top plan view of the pennies change control plate.

Fig. 12 is a detail view of the plate adapted to control the issuance of coins other than pennies.

Fig. 13 is a top plan view of the parts shown in Figs. 9, 10 and 12 showing their inter-relationship.

Fig. 15 is an end view of the change making attachment, the hinged cover being broken away to more clearly bring out the construction of the coin receiving unit and its relation to the coin receiving chute.

Fig. 15A is a sectional view of the coin receiver taken on the line 15A—15A of Fig. 15.

Fig. 16 is a detail view in side elevation of the mechanism provided for enforcing a complete reciprocation of the change making lever.

Fig. 17 is a detail view in side elevation of one of the pennies ejecting units whereby no pennies, a single penny or two pennies may be issued under certain conditions as required.

Fig. 18 is a detail view in side elevation of the coin ejecting unit adapted to issue two pennies simultaneously.

Figure 1:
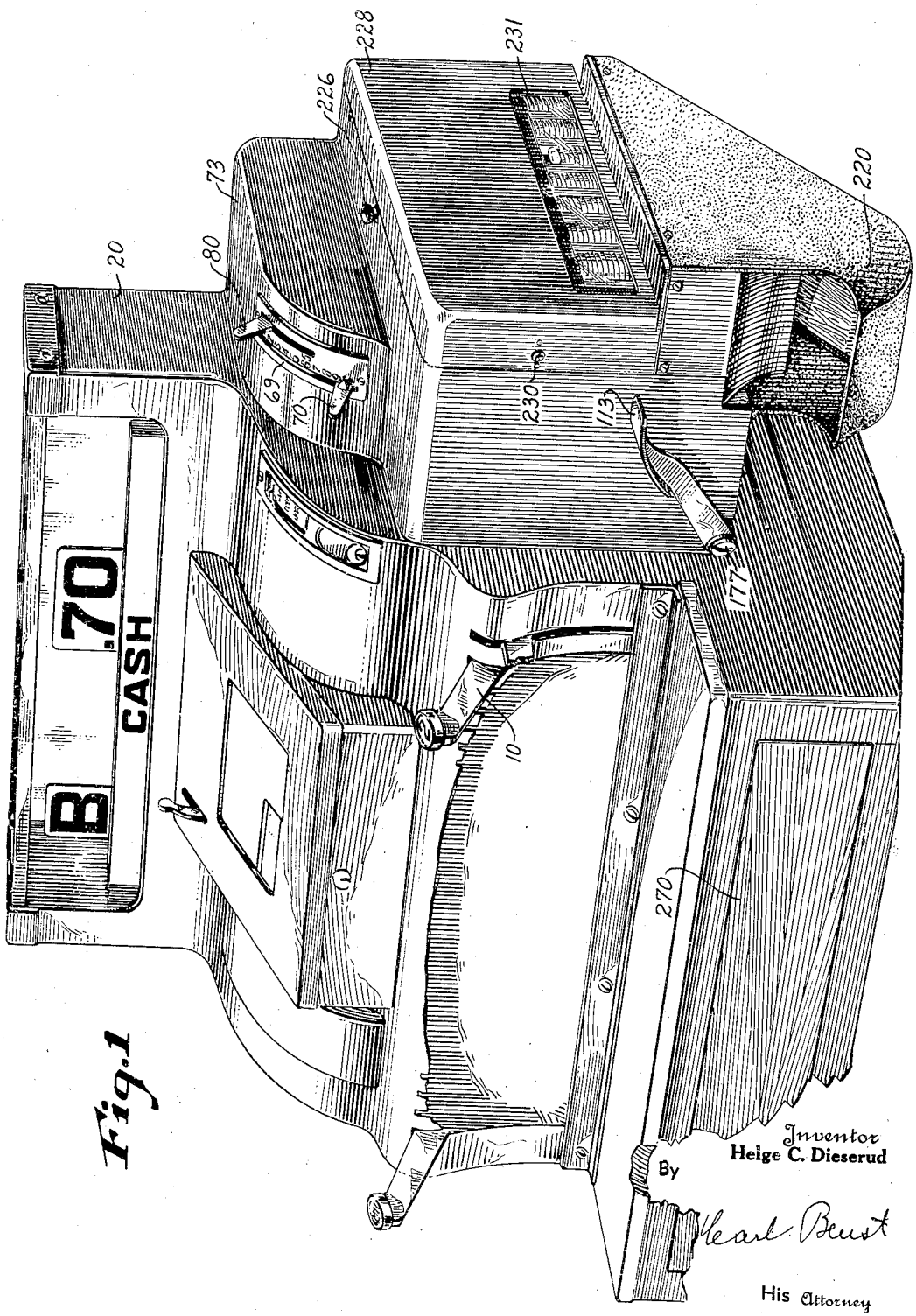
Fig. 1 is a general perspective view of the cash register which has been utilized for the purpose of illustrating the present invention. This view shows particularly the relation between the registering mechanism and the novel coin issuing mechanism.

Figs. 19, 20 and 21 are cross sectional views taken on the lines 19—19, 20—20, and 21—21 respectively of Fig. 17.

Fig. 22 is a detail view showing the markings on the index plate.

Figs. 23 to 28 are detail views of the mechanism illustrated in Fig. 4, but shown in various positions of adjustment.

GENERAL DESCRIPTION

A general description of the mechanisms devised for accomplishing the broad purposes of a change making machine as set forth will now be briefly given. It is contemplated by the present invention to employ suitable receptacles for the coins, or in the event that paper currency is to be handled by the machine, money holders capable of receiving or delivering such currency should be employed. Suitable ejecting means for delivery of the proper coins or currency is provided in proper relation to the latter.

Certain controlling mechanism for selectively rendering the ejecting means operative is provided and the controlling mechanism has connections to manipulative devices such as setting levers which may be adjusted to represent the amounts of money received or tendered. These manipulative devices are adapted to directly adjust the controlling mechanism to render certain of the ejecting units operative so that coins having a total value corresponding to the amount received may be issued. Other manipulative devices, which in the machine illustrated take the form of the cash register keys, are then operated and by a peculiar connection to the controlling mechanism the latter is readjusted to redetermine the amount of coin or money which will be finally delivered from the machine and, of course, this will be an amount different from that initially determined by the setting levers. The ejecting devices are operated by a separate manual device such as a lever but only those ejectors which are rendered operative as determined by the final position or condition of the controlling mechanism will be affected to eject the proper change.

The manipulative devices such as levers, which are adjusted according to the amount of money tendered by the purchaser, in cooperation with the controlling mechanism form a minuend selector mechanism while the series of cash register keys operated in accordance with the amount of a sale constitute a subtrahend selector mechanism.

The controlling mechanism which ultimately determines the particular coins to be issued and which is controlled from the two sources mentioned is divided into two main sections one related to the units or pennies order and the other to the tens or dimes order, these being the only two orders concerned with the making of change in coins under a dollar. These two main sections may be called respectively the pennies selector mechanism and the dimes selector mechanism.

The first adjustment of the dimes selector mechanism which, in the present machine, comprises specifically a single stepped plate having projections cooperating with the ejecting units arranged to eject nickel or silver coins, is directly performed by the dimes setting lever. Correspondingly, the pennies selector mechanism comprises a stepped plate whose projections render the pennies ejectors operative. The pennies selector mechanism is directly adjusted by the pennies setting lever. The readjustment of the dimes and pennies control plates in accordance with the operation of the regular cash register differential mechanism then ultimately determines which ejectors are to be rendered operative when the change issuing lever is operated. The latter has connections to separate actuating devices for the ejectors and the presence of a projection on one of the plates adjacent a certain ejector will cause the latter to be locked to its associated actuator so that continued movement of the change issuing lever will cause the ejector to operate upon and issue the related coin.

In respect to the initial adjustment of the dimes control plate, certain ejectors are set for operations, but the readjustment of the control plate as controlled by the dimes cash register keys renders certain other ejectors operative so as to effect an elimination of certain ones. It is proposed in the present invention to move the dimes control plate in the same direction by both the related setting lever and the cash register keys. Since both movements of the dimes control plate are in the same direction, it is obvious that, in order to subtract in this order, it is necessary to do so by the complemental method. For this reason the mechanism actuated by the "amount tendered" lever is contructed to move the dimes control lever in the additive direction an amount corresponding to the value of the lever, and the mechanism actuated by the cash register keys moves the dimes control plate in the same direction a distance equal to the complement of the value of the keys depressed. However, in respect to subtraction of the cents denomination, the process is the reverse method, that is, the differential devices which control the setting of the pennies control plate are so arranged that the movement effected by the pennies setting lever is opposite to that caused by operation of the pennies registering keys. Thus it will be noted that the computing mechanism constitutes an important feature of the machine, its action being unique and novel in many phases thereof.

In some examples the computing mechanism related to the dimes and pennies denomination merely subtracts the amounts without requiring any transfer or carry-over action between different denominations, such as would occur in a transaction involving the receipt of 25¢ and a sale of 13¢, but most money transactions necessitate the subtraction of an amount such as 58¢ from a larger tendered amount, as 75¢, the amount of sale including a denomination of coins of greater individual value than the corresponding denomination of the tendered amount. In the last cited example the unit denominations (cents) of the purchase amount is greater than the corresponding denomination of the tendered amount. A condition of this sort requires an inter-denominational action of the computing instrumentalities so that when 8¢ is subtracted from 5¢, for instance, the tens denomination mechanism will be controlled to deliver 10¢, where it would previously have delivered 20¢, an action which is really a reverse transfer as contra-distinguished from what is commonly known as a transfer from a lower to higher denomination, such as utilized in the art of cash registers, adding machines, etc.

The instrumentalities employed for accomplishing this necessary mechanical computation incidental to subtraction, or an equivalent arithmetical operation, are simplified to a large extent, are capable of ready actuation in the performance of their functions, and insure absolute accuracy and reliability of action. Such results are attained in a manner entirely new in the art.

More specifically this is accomplished in the present instance by giving the dimes control plate an additional movement in the same direction thus bringing certain other ejectors into operative relation to cause the ejection of coins differing in value, by ten cents, from those which might have been issued.

As previously stated, the dimes control plate may be given two movements longitudinally in the same direction to determine the coins to be issued. The dimes control plate has another movement which is a vertical movement so as to bring either an upper or lower set of projections into cooperative relationship with the ejectors. For a certain position of the plate longitudinally the upper projections cause the actuation of certain ejectors but when it is moved vertically certain other ejectors may come into play and the difference in coins to be issued is of a value of 5¢ or a nickel. In the previously mentioned example, a receipt of 75¢ and a 58¢ sale, a dime will be finally issued, and instead of ejecting seven pennies which is the amount arrived at by mental subtraction the dimes control plate will be raised to issue not only a dime but a nickel, whereas the pennies control plate will cause only two pennies to be issued.

As previously stated, the final positioning of the control plates is determined by the value of the cash register keys operated and since the keys are returned to normal after they have adjusted the control plate differentially it is necessary to provide intermediate mechanism between the cash register differential mechanism and the control plate. In the present invention this intermediate mechanism comprises a secondary differential mechanism, the differentially adjustable member of which is set to different positions by the cash register differential mechanism and left there so that the connected control plate may be retained in its final position of adjustment even though the cash register differential is returned to normal by the restoration of the keys.

The manually operable devices such as the cash register keys, setting levers, and change issuing lever are operated independently of each other. To prevent their simultaneous operation and to insure the proper positioning of the setting levers, the present machine includes associated aligning and interlocking devices which insure the proper operation of the different manually operable members.

While the present description contemplates that the setting levers be set before the cash register keys are operated, it will be obvious that the register keys can be operated first with no variation in the result, or amount of change issued.

The ejectors are of a novel construction and are positively locked to the actuators only when a projection on the control plate is in operative relationship with the ejector. Improvements in the ejecting units are extended to the pennies ejector mechanism whereby one ejector may cause a single penny to be issued, two pennies, or none at all.

The coin receiver is also of novel construction and is arranged from the viewpoint of accessibility and removability, economy of space and compactness in order to carry out efficiently the special uses to which the machine is to be put.

Generally speaking the present invention involves certain details and arrangement of parts which will now be described. It will be first assumed that the machine is used for the purpose of making change and after this special use has been explained it will be shown how the attachment can be used to issue coins of selected amounts.

DETAIL DESCRIPTION

*Framework*

There will now be described the framework of the cash register and the coin ejecting mechanism. The cash register framework comprises two main side frames 15 and 16 (Fig. 2), connected together by suitable transverse members, such as a back frame 17 and a front bar 18. These frame members rest upon the usual base 19 (Fig. 3). The cash register mechanisms may be enclosed by a cabinet 20 of any suitable material.

Referring now more particularly to the structure of the new attachment which contains the mechanism for controlling the ejection of the coins, the frame comprises a horizontal base portion 41 (Fig. 5) and right and left vertical side frames 42 and 43, respectively. In order to support the framework of the attachment by the cash register framework the left frame 43 is attached to the right frame 15 of the cash register by means of screws or bolts 44 and 45 (see Figs. 3 and 5). The right side frame 42 (Fig. 5) is utilized mainly to support a coin receiver supporting bracket 46 attached thereto by screws 48 passing through lugs 47 integral with the bracket 46 and into the side frame 42.

*Keys and driving mechanism of the cash register*

As heretofore stated, the attachment is preferably applied to a cash register and the type of machine which is used for illustrative purposes only is of the form shown in the previously mentioned patent issued to Frederick L. Fuller No.

1,742,701. Only those parts of the cash register which are directly involved in the present invention will be described and for details of construction and operation of other parts not directly involved, reference may be had to the patent just mentioned.

To illustrate the present invention, the improvements have been shown as applied to a cash register of the key-operated type in which depression and return of the keys perform the different functions, such as registering, indicating and printing. The operating keys 10 (Figs. 2 and 3) comprise a plurality of denominational banks of amount keys pivoted upon a rod 21 so that a depression and return of the outer ends of these keys will perform the usual functions. Resting upon the rear ends of the keys 10 is a key coupler 22 (Fig. 3) pivoted at 23. When the outer ends of the keys are depressed the key coupler is rocked clockwise about its pivot 23 so that a nose 24 enters the notches 25 in the rear ends of the operated keys. The construction and purpose of the key coupler mechanism is well known in the art and need not be described in detail.

Connected to the key coupler 22 is a plate 35 carrying two sets of oppositely disposed rack teeth which are adapted to alternately engage the teeth of a pinion 36 (Fig. 3) fast to a drive shaft 37 suitably journaled in the side frames 15 and 16 of the cash register. The connection and arrangement are such that when the key coupler is rocked by the keys the plate 35 will be raised and lowered so that the sets of the rack teeth will alternately engage the pinion 36. In this manner the reciprocating motion of the plate 35 will be converted into a rotary motion of the shaft 37. The device for accomplishing this function need not be described herein in further detail as this sort of mechanism is well known in the art and shown in many patents. For further details of operation of one form of the above, reference may be had to the patent to Thomas Carney #482,161, dated September 6, 1892.

Differential mechanism of the cash register

The cash register also includes a differential mechanism adapted to operate suitable totalizing devices and to adjust type carriers to print the amount entered in the machine. The differential mechanism of the cash register is preferably co-ordinated with a supplemental or secondary differential mechanism and for controlling the latter any suitable differential mechanism may be provided. For the purpose of illustration the differential mechanism shown in the Fuller patent hereinbefore mentioned is shown. The details of construction of this differential mechanism for a single bank will now be described briefly.

As shown in Fig. 3, each key 10 is formed with an upwardly extending arm 26 carrying a stud or roller 27 engaging a cam slot 28 in a plate 29 rigidly mounted in a frame 30 which is loosely mounted on a shaft 31. The cam slots in the plates 29 are graduated so that each of the keys will impart a differential movement to the frame 30. Secured to the frame 30 is a segmental rack 11. As previously stated the keys 10 are arranged in denominational banks and for each bank of keys there is a differentially actuated frame 30 and a corresponding segment rack 11. Each segment meshes with a pinion rigid with its corresponding item type wheel 32 to set up numbers representing the key depressed and by actuating suitable printing mechanism shown in the Fuller Patent No. 1,742,701 previously cited, there may be printed upon a strip of paper the items entered in the machine.

Summarizing the operation of the differential mechanism above described, it will be obvious that when a key 10 is depressed its associated frame 30 will be differentially operated and upon return of the key the frame will be restored to its normal position.

Secondary differential mechanism

Also co-ordinated with the differential mechanism just described is another or secondary differential mechanism which is controlled by the former, but is so organized that the member which is differentially adjusted will be left in its position of adjustment even after the operated keys are returned to normal. The reason for this construction will be obvious as the description of the machine progresses.

As heretofore stated stepped movable control plates are utilized for controlling different coin ejector units which are aligned with their respective stack of coins so as to eject, or not eject, one or more of the associated coins. Therefore, it will be apparent that in order to eject the proper coins which comprise the difference between the amount tendered to the operator and the amount of the sale, the movable control plates will be governed by two main factors, such as the amount tendered to the operator (as represented by suitable setting devices) and the amount to be registered by the machine (as represented by the operating keys of the cash register).

In the machine shown the control plates are first adjusted by the setting levers which are set to positions corresponding to the amount tendered. The operating keys are subsequently operated which re-positions the control plates so that when the change issuing lever is subsequently operated the re-positioned control plates will determine the action of the coin ejectors on the various stacks of coins. While the secondary differential mechanism re-positions the control plates it permits them to stay in their proper positions even though the keys 10 are returned since it will be clear that if a direct connection was provided the return movement of the control plates would cause them to lose their effect upon the coin ejecting units. The manner in which the secondary differential mechanism of the cash register controls the adjustment of the control plates and leaves them in this position to later control the coin ejecting units will now be described.

While the main differential device is utilized for each bank of amount keys such as cents, dimes and dollars, secondary differential mechanisms are provided only for the cents and dimes group of keys due to the fact that the controlling plates in the present machine are adapted to control the issuance of change amounting to less than a dollar.

It will be observed in Fig. 2 that a bail 50 loosely mounted on the shaft 31 is pinned to the dimes differentially actuated segment frame 30 heretofore mentioned and has an integral upwardly extending arm 49 (Fig. 4). The upwardly extending arm 49 has connected thereto at its upper end a rearwardly extending link 51 connected at its rear end to a cam slotted arm 52. The arm 52 is pivotally supported at its lower end upon an arm 53 of a lever 54 loosely mounted on a shaft 55. The shaft 55 is mounted for support in the rear frame 17 of the machine by means of suitable perforated bosses 56 (Fig. 2) which project from the back frame 17 and through which the shaft 55 passes. The shaft 55 also projects through the frame 15 and the side frame member 43 into the new attachment, as clearly shown in Figs. 2 and 5. Pinned to the shaft 55 is an upstanding arm 58 which has at its upper end a bent portion or lug 59 (Fig. 4) which is in the path of movement of the arm 52 and lever 54.

Loosely mounted upon the shaft 31 is an arm 60 (Fig. 4) carrying at its rearward end a cross pin 61 adapted to engage a cam slot 62 of the arm 52. It will be noted in Fig. 4 that when the arm 52 is in the position shown, the cam slot 62 is eccentric with respect to the shaft 55 so that movement of the arm 60 will cam the lower portion of the arm 52 rearwardly and force the lever 54 clockwise. It should also be observed (Figure 28) that when the arm 52 is in its rearmost position the cam slot 62 is concentric with respect to the shaft 55.

Pinned to the driving shaft 37 is a box cam 63 (Fig. 4) the cam race of which cooperates with a pin 64 carried by the arm 60, the cam slot being so designed that upon each operation of the machine by the registering keys the box cam 63 will effect an oscillating movement to the arm 60.

Figure 23:
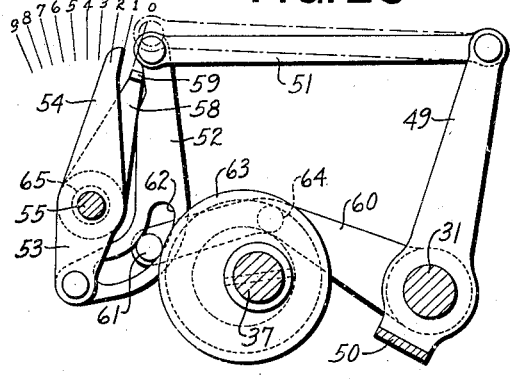
Figure 24:
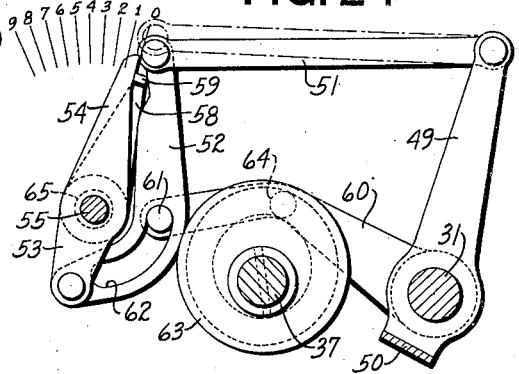

The parts shown in Fig. 4 are in the positions they assume when the machine comes to rest after an operation without a key in the dimes bank having been previously operated and if the machine should subsequently be operated without a key in this bank being depressed, it will be noted that in this case the dimes differential frame 30 will not be moved (see Figs. 23 and 24) and the arm 49 will therefore be retained in the positions shown in Fig. 4. As the machine is initially operated the box cam 63 acting upon the pin 64 will elevate the arm 60, and the pin 61 cooperating with the cam slot 62 will force the arm 52 rearwardly, the upper end of the lever 54 at this time approaching the arm 52 to contact the lug 59 of the arm 58. Fig. 23 shows the positions of the parts after the cam 63 has been rotated one quarter of a rotation, and Fig. 24 after the cam 63 has been rotated one half of a rotation. At substantially the extreme downward movement of the operating keys 10 (as shown in Fig. 24) the lever 54 will have contacted the lug 59 so that during the return movement of the keys 10 the box cam 63 acting upon the arm 60 will reversely move the lever 54 drawing it away from the lug 59 until the parts again assume the positions shown in Fig. 4. In this operation of the machine, it will be noted that no movement has been imparted to the arm 58 or shaft 55 by the arm 49 since no key in the dimes bank has been operated.

Figure 25:
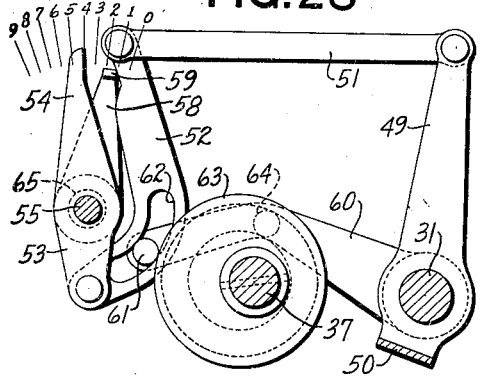
Figure 26:
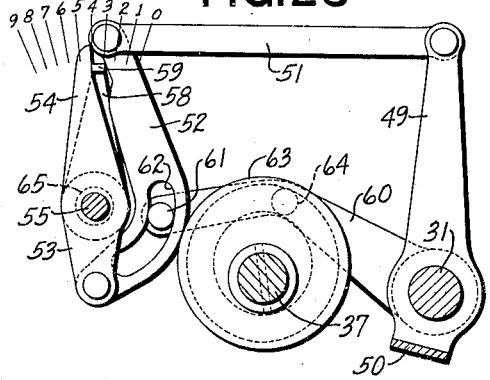

If, for example, the "40" key 10 of the dimes bank is depressed (see Figs. 25 and 26) the associated frame 30 will be operated differentially to give a proportional amount of movement to the arm 49 and link 51. At the same time this movement is taking place the pin 61 will play in the slot 62 and the effect of this action with respect to the arm 52 is that it may force or cam the lever 54 to approach the lug 59 of the arm 58. Fig. 25 shows the position of the stud 61 in the cam slot 62 after a one-quarter rotation of the cam 63; that is, when the 40 cent key is depressed half way down. At the same time the pivotal point between the arm 52 and link 51 is being moved rearwardly to an extent of four steps and by the contact of the arm 52 with the lug 59 the arm 58 will be given a proportional amount of movement. Fig. 26 shows the position of the stud 61 in the cam slot 62 after a one half rotation of the cam 64; that is, after the 40 cent key has been fully depressed. After the arm 58 has been properly positioned the return movement of the keys will reversely move the arm 52 and lever 54 so that they move away from each other bringing the parts again to the positions shown in Fig. 4, but the arm 58 and connected shaft 55 will be left in their positions of adjustment.

Figure 27:
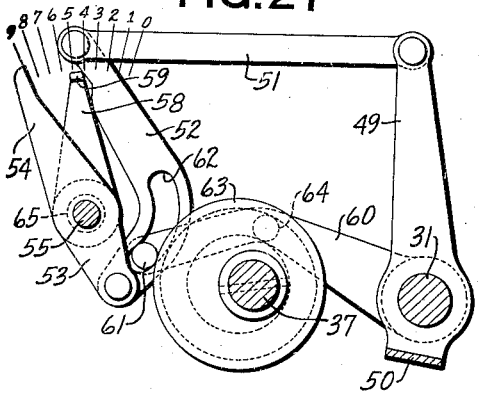
Figure 28:
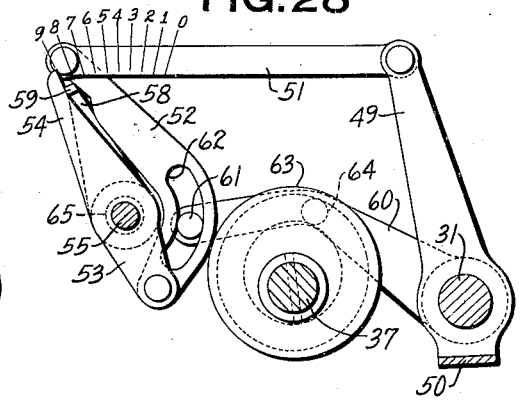

If, for example, a "90" key 10 should be depressed the lever 52 will be moved its maximum distance rearwardly, and by the time this maximum distance is reached the stud 61 will have reached its maximum movement in the slot 62 and therefore the arm 54 receives no movement. Thus, the arm 58 will be given the maximum rearward movement until the lug 59 co-acts with the lever 54, the lever 54 in this case being left in the position shown in Fig. 4 and the arm 52 given the maximum amount of movement. The movement of the parts when the 90 cent key is depressed is illustrated in Figs. 27 and 28. Fig. 27 illustrates the positions of the parts when the 90 cent key is depressed half way and Fig. 28 illustrates their positions when the 90 cent key is depressed all the way. It should be noted that the cam slot 62 is so developed that in the case of depressing a 90 cent key the faster movement of the arm 52 under influence of the 90 cent key and arm 49 neutralizes any tendency of the cam 63 to rock the arm 54. This is the case only when the 90 cent key is depressed. When any other key is depressed, the two arms 52 and 54 move toward each other at the same time, but relative movement toward each other is dependent upon the value of the key depressed.

It will be noted, therefore, that the scissors-like action of arm 52 and lever 54 will effect a positive positioning of arm 58 during every registration of the machine and move it in accordance with the amount registered.

It will also be noted that in every registering operation the arm 58 is moved directly from one position to the other without passing through a constant or normal position and that at the termination of the last half of the cycle of operation the arm 58 will remain in the position to which it is adjusted.

Referring to Figs. 2 and 4, it will also be noted that connected to the cents differential frame 30 is an arm 48 which is similar to the arm 49 associated with the dimes differential device. Also attached to the arm 48 is a rearwardly extending link 40 connected to an arm 57 which, in turn, is connected to a lever 34, the last-mentioned parts being similar to those numbered 49, 51, 52 and 54 respectively, associated with the dimes differential mechanism. The pin 61 extends through the arm 60 sufficiently so that it may also cooperate with a cam slot formed in the arm 57. The lever 34 and an arm 33 (corresponding to the lever 54 and arm 58 of the dimes differential device) are, however, fast to a sleeve 65 which surrounds the shaft 55 and which also extends to the right into the new attachment (see Figs. 2 and 5). The result of the construction just described is that in a similar manner the arm 33 will also be differentially positioned and retained in its position of adjustment at the termination of the operation of the keys 10 and that with respect to both secondary differential mechanisms a return movement of each differential frame 30 will have no effect upon the differentially adjusted elements 58 and 33.

As stated heretofore the shaft 55 and sleeve 65 extend to the right into the coin ejecting section of the machine and each has attached thereto its respective segment 66 or 67 (see Figs. 5 and 6) which, by suitable connections actuate planetary differentials to re-position the control plates for determining the ejection of the proper coins.

Amount tendered controls

As heretofore stated, means are provided for positioning elements within the attachment corresponding to the amount tendered and in the present instance such means comprises two independently adjustable levers, one representing the dimes denominational order, while the other represents the pennies order.

The dimes setting lever 70 is loosely mounted on the shaft 55 adjacent the end of the sleeve 65 (see Figs. 5, 6, 7 and 10) and has a segmental aligner extension 71 (Fig. 10). The lever 70 terminates in a setting handle (Fig. 7) adapted to be moved in a slot formed in a graduated scale plate 69 (Figs. 1 and 22) marked from 0-9 and $ and which is fast to a casing 73 for the change making attachment. The lever 70, furthermore, has attached thereto a sleeve 74 (Figs. 6 and 10) surrounding the shaft 55 and extending to the right and at its end has attached thereto a downwardly extending rack segment 75. It will be observed in Fig. 6 that the segment 75 is positioned near or adjacent the segment 66 heretofore described, which is connected for movement with the dime differential frame 30 by the shaft 55. These two segments 66 and 75 are adjacent each other and so positioned as to control the adjustment of the dimes control plate by means which will presently be described.

A penny setting lever 80 like the dimes setting lever 70 (Fig. 5) is loosely mounted upon the sleeve 74 and also carries a rearward aligning segmental portion 79 (Fig. 7) and is offset as at 81 (Fig. 5) so as to provide a larger physical separation between the handles of the setting levers 70 and 80. The lever 80 also plays in a slot formed in the scale plate 69 which is also marked with the figures "0" and "5" adjacent the said slot. The lever 80 is further provided with a downwardly extending segment 82 (Figs. 5 and 6) in juxtaposition with the aforementioned segment 67 which is connected to the sleeve 65 and actuated by the connections to the pennies differential frame 30. It will be evident that this last combination of parts which is associated with the pennies order is similar in character to that described in connection with the dimes order.

From the above, it will be clear that two distinct pairs of segments are provided, one comprising the segments 75 and 66 while the other comprises the segments 82 and 67. The first, 75 and 66, cooperate with the dimes plate controlling mechanism and the last, 82 and 67, cooperate with the pennies plate controlling mechanism.

Coin ejecting control mechanism

As heretofore stated the present invention includes mechanism for shifting stepped coin control plates in accordance with the amount of change to be issued which is, of course, the difference between the amount tendered and the amount registered. The manner in which the control plates must be formed and their means of positioning are dependent upon the different denominations of the coins which they are adapted to issue. For example, a control plate 123 which is adapted to be shifted under control of the pennies setting lever 80 and the pennies differential mechanism is capable of determining the ejection of pennies, of an amount from one to four as will be seen and explained in detail hereinafter, while a control plate 103 which is controlled both by the dimes setting lever 70 and the dimes differential mechanism is capable of controlling the ejection of the following coins, 5¢, 10¢, 25¢ and 50¢. The explanation of the means whereby the last mentioned control plate assumes the necessary positions to eject certain coins will now follow.

Dimes control plate

In the description to follow the plate 103 will be conveniently designated as the "dimes control plate." This plate 103 controls the issuance of dimes and coins which are multiples of five or ten.

As best shown in Figs. 5, 6 and 10, the pair of dimes control segments 66 and 75 are each adapted to mesh with their respective pinions 85 and 86 which are geared together and carried by a plate 87 loosely mounted on the sleeve 74 (Fig. 6). The pinions 85 and 86 are so formed and positioned upon the plate 87 that beside their engagement with their respective segments and their intermeshing, the gearing is so arranged that if one of these pinions is given a movement in a certain direction by its companion segment, the associated pinion will be rotated reversely a corresponding amount.

Connected to the plate 87, by means of a pin 88 (Fig. 10) fitting in an open slot 89, is a horizontally movable slide 90. The principal means by which the slide 90 is supported in its horizontal movement comprises an elongated opening 91 through which projects an extension of the segment shaft 31 (Fig. 2). It will be understood that the extension of the differential frame supporting shaft 31 is not essential to the functioning of the attachment but it is advantageously utilized simply because of its size and location and to strengthen the structure. It may be well to state here that the rotation shaft 37 (Fig. 2) is similarly extended and advantage is also taken of this to use a plate 92 (Fig. 5) to unite these shafts at their outer ends with the shaft 55 and in this manner a very rigid construction is produced and thus furnishes a solid suspension for the differential controls as well as their connections.

Returning to the manner in which the slide 90 is horizontally guided, it will be noticed that smaller fixed plate 93 (Figs. 2, 5 and 9) is supported by the shafts 37 and 31 and is positioned near the slide 90. The plate 93 carries a guiding pin 94 (Figs. 9 and 10) which projects into a horizontal slot 95 (Figs. 10 and 13) in the slide 90 and thereby the slide 90 is prevented from taking any other course than a true horizontal movement.

Carried by the slide 90 (as best shown in Figs. 7 and 10) are two guide pins 83 and 84 adapted to engage respective angular slots 97 and 98 formed in another plate 99. This plate 99 (Fig. 9) is provided with an open slot or notch 100 adapted to engage a pin 101 which is fast to an upward extension 102 of the dimes control plate 103 (Figs. 7 and 12). The control plate 103 is reciprocated horizontally and for this purpose is provided at its lower portion with slots 105 (Fig. 7) engaging supporting pins 106 each carried by pivoted bell cranks 107 and 108 (Figs.

5 and 7) which will hereinafter be more fully described.

The plate 103 is cut away to form a lower control bar 109 (Fig. 12) and an upper control bar 110. The inner and oppositely formed edges of these bars are provided with projections 111 and depressions 112 which are so disposed and arranged thereon as to have a positive or negative effect upon the elements which cause the actuation of the coin ejecting slides for the ejection of the denominations of coins, such as, nickels, dimes, quarters and fifty-cent pieces.

In order to bring out more clearly the more difficult problems and phases which machines of this character are obliged to solve and contend with there will be first explained the action of the mechanism which merely involves the ejection of the proper coins to give change from one dollar.

In case a dollar is tendered to the operator the dimes setting levers 70 (Fig. 1) will first be brought to its lowest position or adjacent the $ mark on the scale 69. The cents setting lever 80 will, however, be brought to its uppermost position or adjacent the "0" mark. This setting of both levers will designate that the machine is conditioned for giving change from one dollar.

As will be observed in Fig. 12, the controlling plate 103 is shown in its lowermost position in which some of the upper set of controlling projections 111 of the control plate 103 are active while the lower set of projections 111 will, in the position of the plate shown, be inactive. Reference characters 114 in Fig. 12 designate coin ejector control arms which will be later described in detail in connection with the coin ejector mechanisms. These control arms 114 are appurtenant to the various coin ejecting units and for the present it may be stated that when one of these arms 114 cooperates with a projection 111 it will render the associated coin ejecting unit effective. Each of the coin ejecting units carries an upper and lower arm 114 and it will be noted that in Fig. 12 the upper set of arms 114 is in cooperation with the upper projections 111 of the plate 103, while the lower set of arms 114 is at some distance from the lower projections 111, and, therefore, the latter will be inactive and have no influence upon the ejecting units. The control arms 114 are also identified in Fig. 12 by numerals to identify the various coins which they are intended to control the ejection of, and are designated as 5¢, 10¢, 10¢, 25¢ and 50¢.

The plate 103 in its normal position is adapted to control the ejection of coins amounting to one dollar, since it will be noted referring particularly to the areas marked "$" that there is a projection 111 normally over the upper control arm 114 of the 5¢ ejecting unit and likewise there are projections 111 over the upper arms 114 of the two 10¢ ejecting units. Similarly, the upper control arms 114 of the 25¢ and 50¢ ejecting units are in cooperation with overlying projections 111 of the plate 103. Therefore, it will be noted that when the plate 103 is in the position shown and the coin ejecting units subsequently operated, as will be hereinafter described in detail, the coin ejecting units associated with all the stack of coins will be operated and there will be issued, therefore, one coin of each of the following 5¢, 10¢, 10¢, 25¢ and 50¢, amounting to $1.00.

In the event that the operator registers a sale amounting to 10¢ and a dollar bill is tendered him the action of the mechanism to issue change from $1.00 amounting to 90¢ is as follows: When the 10¢ key of the dimes bank of the cash register is operated the dimes differential frame 30 will be actuated so that it will adjust the arm 49 (Fig. 3) link 51 and arm 52 proportionately, so that the secondary differential mechanism hereinbefore described will adjust the arm 58 to a units position and allow it to remain in this position. Adjustment of the arm 58 will also rock the shaft 55 thereby rocking the segment 66 to the right as viewed in Fig. 10. Rocking of the segment 66 will drive the pinion 85 clockwise and the pinion 86 counter-clockwise, but since the segment 75 at this time remains stationary and in fact, as will be subsequently described is locked against movement, the pinion 86 will roll over or planetate on the stationary segment 75 and will result in moving the plate 87 to the right (Fig. 10) and through the pin 88 and slot 89 force the slide 90 one step to the right (Fig. 10). By means of the plate 99 which connects the slide 90 with the extension 102 of the control plate 103, the latter will be positively moved to the right. The amount of movement given to the plate 103 is equivalent to a single step as designated by the areas marked "1".

Therefore, when the plate 103 is moved to a position so that the areas marked "1" coincide with the arms 114, it will be noted that upper projections 111 will cooperate with the control arms 114 associated with the following coin ejecting units 50¢, 25¢, 10¢ and 5¢, it being obvious that the control arm 114 associated with one of the 10¢ ejecting units cooperates with a depression 112. When the coin issuing lever 113 (Fig. 1) to be later described in detail is subsequently operated the following coins will be issued 50¢, 25¢, 10¢ and 5¢ amounting to 90¢ which is the necessary change.

In a similar manner when a 20¢ sale is registered the secondary differential mechanism will be actuated to such an extent that the plate 103 will be given a movement of two steps to bring the areas marked "2" to coincide with the arms 114 to permit the following coins to be issued; 50¢, 25¢ and 5¢ amounting to 80¢ which is the change necessary. When the sale amounts to 90¢ the plate 103 will be given nine steps of movement and by observing the areas marked "9", it will be noted that the only projection 111 which will cooperate with one of the control arms 114 is the one which is correlated with the 10¢ ejecting unit adjacent the 5¢ ejecting unit, and obviously, when the coin issuing lever is operated only a 10¢ coin will be issued.

When certain transactions involve the receipt of sums less than one dollar and the sales are of lesser amounts the controlling plate 103 is given a double movement, first, by an operation of the setting lever 70 and subsequently an additional movement in the same direction by an operation of the keys 10 of the cash register, the last mentioned operation re-positioning the control plate 103 to subtract the amount of the sale from the amount tendered.

The operation of the mechanism for the above types of transactions will be explained by giving several examples. In the event that the transaction should be one amounting to 30¢, and 50¢ should be tendered, the pennies setting lever 80 will be brought or retained in the position shown in Fig. 1 or adjacent the zero mark on the scale 69, but the dimes setting lever 70 will be positioned adjacent the indicia "5" indicating that the amount tendered is equivalent to five dimes. When the setting lever 70 is moved upwardly to the desired position the segment 75 (Fig. 10) is rocked counter-clockwise. As will be explained hereinafter the segment 66 is normally locked so that when the segment 75 is moved in a counter-clockwise direction it will turn the gear 36 in a clockwise direction, and, therefore, the gear 85 in a counter-clockwise direction, the gear 85 at this time planetating or rolling over the stationary segment 66 which will result in moving the plate 87 to the right (as viewed in Fig. 10) and through the connections previously described moving the control plate 103 an amount equivalent to five steps. This will result in bringing the areas designated by numerals "5" and the projections 111 enclosed thereby in cooperation with the various control arms 114. The 30¢ key in the dimes bank of the cash register is then operated and by means of the secondary differential mechanism hereinbefore described the arm 58 (Figs. 3 and 4) will be given a movement equivalent to three steps. This will result in moving the segment 66 counter-clockwise (Fig. 10) and through the planetary gear differential mechanism will give the control plate 103 an additional movement of three steps now bringing the "8" areas in cooperation with the control arms 114. At this position of the plate it will be noted that two dimes will be issued which is the required change. It will be observed that the plate 103 occupies the same position in the example just given as would be the case if 80¢ was subtracted from a dollar.

If the amount tendered should be 50¢ and the sale amounted to 20¢ the setting lever 70 will, when it is moved from the position shown in Fig. 1 to the "5" position, move the control plate 103 a movement of five steps as previously described. When the 20¢ key in the cash register is operated the secondary differential mechanism will move the segment 66 counter-clockwise (as viewed in Fig. 10) and give it an additional movement of two steps. This will result in giving a total movement to the plate 103 of seven steps bringing the "7" areas in range of the control arms 114. When the control plate 103 assumes this position it will cause the ejection of a quarter and a nickel totaling 30¢ which is the change necessary. Also in this case the problem given is exactly the same as if the sale was 70¢ and the amount tendered a dollar, the plate 103 occupying the same position in each example.

In the last mentioned example it will be observed that the control plate 103 is given a movement directly proportional to the setting of the dimes lever, that is, to say, a setting of the lever 70 from the $ position to "5" on the scale 69 gives a movement of five steps to the plate 103. Under ordinary circumstances, if 75¢ were tendered and the adjustment of the lever 70 from "0" to "7" would give the plate seven steps of movement and if the sale was 60¢, six more steps of additional movement would be given to the plate 103 by the dimes secondary differential mechanism. This would require a large movement of the plate 103 and a long plate. In order to eliminate both of these objectionable features, the mechanism is so arranged that the plate 103 is given a movement from its Figure 12 position which is the tens complement of the value of the setting of the lever 70 so that in any transaction the plate will never be given a movement of more than ten steps except as hereinafter described.

Attention is directed to the fact that in order to take care of the above, the figures on the scale 69 for the dimes lever 70 are marked reversely. That is to say, a movement of the lever 70 from the lowest position or $ position along the dimes scale to a position such as "9" will not give a movement of nine steps to the control plate 103, but will impart a movement of only one step which is the tens complement. Similarly when 75¢ is tendered movement of the lever 70 from the lower-most or $ position to the "7" position will give the control plate 103 a movement equivalent to three steps. When the 60¢ key of the cash register is then operated the plate 103 will be given an additional movement of six steps or a total movement of nine steps at which point the control plate 103 will cause a single dime to be issued from the machine and as will be explained hereinafter a nickel is also issued under the circumstances given.

Therefore, it will be noted that in subtracting one amount from another which is less than a dollar, it is not performed by reversely shifting the control plate but by first giving the control plate 103 a primary movement by the setting lever 70 in units from from its $ or Fig. 12 position which is the tens complement of the amount represented by the money tendered. Operation of the cash register keys will then give the control plate 103 a supplemental movement which is directly proportional to the amount registered.

*Pennies control plate*

The parts comprising the differential mechanism which controls the adjustment of the pennies denominational control plate and its connections will now be given and afterwards the operation of this mechanism will be explained by giving several examples.

As is best shown in Fig. 1, the pennies setting lever 80 is adjustable to two different positions, one of which is marked by a "0" on the scale 69 and the other by the numeral "5". When the pennies setting lever is in the upper-most position it is adjacent the "0" which indicates that no pennies are involved in the transaction. The other position indicates that the sum of 5¢ or 5¢ plus some other amount has been tendered to the operator. As will be explained hereinafter the setting lever 80 must be adjusted to either one position or the other and if it occupies a mid-way position the cash register and coin ejecting lever will be locked against operation.

As previously stated the setting lever 80 is loosely pivoted upon the sleeve 74 (Fig. 6) and has at its lower end an integral rack segment 82 (Fig. 7). Also loosely mounted upon the sleeve 74 is a plate 115, and as in the case of the aforementioned plate 87 associated with the dimes planetary gear differential, it carries at its lower portion two intermeshing pinions 116 and 117. It will be seen by referring to Fig. 5 that the pinion 117 meshes with the rack segment 82 while the pinion 116 meshes with teeth of the segment 67 hereinbefore referred to, thus constituting a planetary differential gear mechanism.

The plate 115 at its lower mid-portion carries a pin 118 (Fig. 9) fitting in a slot 119 made in an upstanding portion of a bracket 120 which is secured to a horizontal portion of a pennies control plate 122 (see Figs. 5, 9 and 11). This plate 122 also has downward integral extensions 123 and 124 (Fig. 5), the extension 123 being cut away to form a lower control bar 125 and an upper control bar 126. The inner and oppositely formed edges of said bars are also provided with projections 127 and depressions 128. The projections or depressions cooperate with their respective control arms 114 of a coin ejecting unit which is adapted to eject a single penny at a time as determined by the correlation of either control arm 114 with its associated projection 127. In the event that both arms cooperate with a pair of projections 127 the ejecting unit will serve to control the ejection of two pennies simultaneously but in the absence of a projection no penny will be issued.

Since it is at times necessary to issue more than 2¢ to properly make change in the decimal system of coinage an additional or auxiliary control plate is provided and is adapted to be moved for adjustment concurrently with the control plate 122. As will be noted in Figs. 5, 9 and 11 a foot of the bracket 120 extends downwardly through an aperture 131 (Fig. 11) made in the control plate 122 and forms an auxiliary control plate 130. This control plate 130 is provided with a set of projections 132 and depressions 133 (Fig. 9) which are adapted to cooperate with the control arm 114 of a special ejector unit which will serve to control the ejection of two additional pennies when needed.

The pennies denominational control plate 122 and its auxiliary control plate 130 as will be seen in Figs. 5, 9 and 11, are adapted for a reciprocal horizontal movement by providing elongated slots 134 in the extensions 123 and 124 which are engaged by guiding pins 135 carried by a U-shaped bracket 136 attached to the base 41 of the coin attachment by means of screws 137.

In order to explain the operation of the pennies denominational differential mechanism as involved in some types of transactions, several examples will be given in which it will be assumed that 5¢ has been tendered to the operator and the sales are successively 1¢, 3¢ and 4¢.

If the pennies setting lever 80 should be in the upper-most position (Fig. 1), it is brought down to the position adjacent the numeral "5" and the dimes setting lever 70 is brought upwardly until it is adjacent the "0" mark. During the setting of the lever 80 the segment 82 (Fig. 7) will be rocked clockwise and the pinion 117 will be rotated in a counter-clockwise direction thus rotating the pinion 116 clockwise and since the segment 67 is at this time stationary and in fact, as will be presently described, is locked in position, the pinion 116 will roll over the stationary segment 67 thus driving the plate 115 to the left as viewed in Fig. 9. This will result in sliding the control plate 122 also to the left (Fig. 9) giving it a movement equivalent to five units bringing the areas designated by the numerals "5" over the various control arms 114.

It will now be assumed that a 1¢ sale has been made by the operator in which case he will depress and return the 1¢ key 10 of the cents differential mechanism thus adjusting the secondary differential mechanism so that the arm 33 (Fig. 2) will be set to a units position and allowed to remain in this position. This will result in rocking the sleeve 65 and also the segment 67 counter-clockwise (Fig. 7). When the segment 67 is rocked in the counter-clockwise direction it will drive the pinion 116 clockwise and the pinion 117 counter-clockwise, the latter rolling over the stationary segment 82 thus bringing the plate 115 one step to the right (Fig. 9). This will also result in moving the control plate 122 to the right a movement of one step which will now bring the areas marked "4" in range of the control arms 114. At this time it will be noted that an upper projection 127 will cooperate with the upper control arm 114 of the 1¢ ejecting unit and also a lower projection 127 will likewise cooperate with the lower control arm 114 of the same ejecting unit. Furthermore, a projection 132 of the auxiliary control plate 130 will also cooperate with the control arm 114 of the 2¢ ejecting unit. Therefore, when the coin issuing lever is operated it will result in ejecting four pennies which is the required change.

Summarizing the above, it will be clear that adjustment of the pennies setting lever 80 to the "5" position will give a movement of the control plates 122 and 130 equivalent to five units in one direction and an operation of the cash register keys 10 of values less than five will move the control plates 122 and 130 a number of units in the opposite direction and proportional to the value registered.

If 5¢ should be tendered to the operator and a 2¢ sale registered, operation of the 2¢ registering key 10 will move the control plates 122 and 130 to bring the areas marked "3" from the areas marked "5" in range of the various control arms 114. At this position it will be noted that the upper control arm 114 of the 1¢ ejecting unit will be inactive while the lower control arm 114 will serve to control the ejection of a single penny. The cooperation of the projection 132 of the plate 130 with the control arm 114 of the 2¢ ejecting unit will serve to control the ejection of two pennies simultaneously and a total of 3¢ will be ejected from the machine which is the required change.

If 5¢ should be tendered to the operator and the setting lever 80 placed at this position and the sale registered is four cents, the control plates 122 and 130 will first be given a movement of five units to the left and four to the right as controlled by the 4¢ registering key 10. This will bring the areas marked "1" in range of the control arms 114 and when the coin issuing lever is subsequently operated the upper control arm 114 of the 1¢ ejecting unit will be inactive while the lower control arm 114 of the same ejecting unit will be active to control the ejection of a single penny. It will be noted that in this case the control arm 114 of the 2¢ ejecting unit will be inactive and only a single penny will, therefore, be issued which is the required change.

Attention is directed to the fact that when the dimes setting lever 70 was moved to the "0" from the $ position the control plate 103 was given a movement of ten steps at which point none of the upper projections 111 in the areas marked "10" will have any effect upon the ejecting units associated with the plate 103.

The operation of the pennies controlling mechanism in the types of transactions involving the receipt of a coin such as a dime and the tendering of change for sales amounting to more than 5¢ such as 6¢, 7¢, 8¢ and 9¢ will be explained by citing several examples.

In case the sale is 9¢, it is necessary to position the dimes setting lever 70 adjacent the "1" mark on the scale 69 and the pennies setting lever 80 adjacent the "0" mark. A subsequent depression of any of the registering keys 10 having a value above 5¢ such as, for example the 9¢ key, will cause the plate 115 (Fig. 9) and therefore, the pennies denominational control plates 122 and 130 to be moved nine steps to the right bringing the areas marked "1" in range of the various control arms 114. The only control arm 114 which will be set for operation is the lower one of the 1¢ unit which cooperates with a projection 127 of the lower bar 125 of the plate 122. This will cause the ejection of a penny, the change necessary.

Similarly, if 7¢ should be registered the control plates 122 and 130 will be moved seven steps to the right (Fig. 9) bringing the area "3" in correlation with the various control arms. In this instance it will be noted that the lower control arm 114 of the 1¢ ejecting unit will cause the ejection of 1¢ and furthermore, the projection 132 of the plate 130 will cause the 2¢ ejecting unit to function causing the ejection of a total of three pennies which is the change necessary.

*Inter-denominational control of control plates*

The mechanism which has just been explained so far does not take in account the elimination of the dime which would ordinarily be ejected by the adjustment of the plate 103 under control of the dimes setting lever 70. In the examples given above where 10¢ is tendered it will be obvious that adjustment of the dimes setting lever 70 from the $ position to the "1" mark will give a movement of nine steps to the plate 103 causing one of the upper projections 111 to co-act with the upper control arm 114 of one of the 10¢ ejecting units. If the machine should be operated with the plate 103 in this position 10¢ will be improperly ejected.

This principle of operation is also involved where the amount of sale or purchase is such that the value of the cents or units denomination is greater than the value of the corresponding denomination of the amount tendered. An example of such a transaction is the determination and selection of the change where the amount tendered is 25¢ and the amount of sale is 8¢ it being noted that the amount of sale includes a pennies value (8¢) which is of greater individual value than the corresponding denomination of the tendered amount (5¢). A condition of this sort requires an inter-denominational action of the change controlling instrumentalities so that when 8¢ is subtracted from 5¢ for instance, the tens denominational mechanism will be controlled to deliver 10¢ where it would previously have delivered 20¢, an action which is really a reverse transfer as contra-distinguished from what is actually known as a transfer from a lower to a higher denomination such as utilized in the art of cash registers, adding machines, etc.

The instrumentalities and the action of the mechanism for accomplishing this necessary mechanical computation incidental to subtraction will now be explained by setting forth the principles involved to require the elimination of the dime when 8¢ is subtracted from 10¢.

As previously stated, the connection between the plate 103 (Fig. 12) and slide 90 (Fig. 10) is not positive but on the other hand the pins 83 and 84 carried by the plate 90 engage slots 97 and 98 in the plate 99 which are inclined at an angle of about 45°. Normally the pins are engaged in the upper portions of the slots by a horizontal guiding slot 138 engaging a pin 139 of a shiftable bell crank 140 which is pivoted at 141 upon the stationary plate 93. It will be apparent that if the plate 99 should be raised upwardly, the co-action of the slots 97 and 98 upon their respective pins 83 and 84 will cause the control plate 103 to be moved an additional step to the right (as viewed in Fig. 12) thereby moving it from the "9" position caused by adjustment of the dimes setting lever 70, to the "10" position, thus bringing the areas marked "10" in range of the upper control arms 114 in which position it will be noted that no upper projection 111 and arm 114 will be functionally correlated and no coins will be ejected. The position of the plate 99 is determined by a cam slot 142 (Fig. 9) co-acting with a pin 143 carried by one arm of the bell crank 140. The form of the cam slot 142 is such that when the plate 115 is moved counter-clockwise from the position shown in Fig. 9 (which corresponds to the setting of the pennies lever 80 at "0") to any of the positions marked 1–9 as controlled by the cents registering keys 10, the cam slot 142 will co-act with the pin 143 to rock the bell crank 140 and through the plate 99 move the plate 103 an additional amount. Therefore, it will be noted that when the pennies order of an amount of sale exceeds the pennies order of the amount tendered the bell crank 140 will be shifted to prevent the issuance of a dime.

In fact this same principle of operation is involved when the sum received is a multiple of ten, such as, 20, 30, 40, etc., and where the sale is an amount from 1 to 9 cents. In this case the plate 103 will be moved directly by the dimes setting lever 70 a distance from the $ position equivalent to the tens complement of the amount set up and an additional units distance in the same direction by the pennies control plate 122 to eliminate a dime, since the slot 138 provides for lateral adjustment of plate 103 as well as an upward movement by the plate 99 in any position of the plate 103.

The cam slot 142 is formed with two branches, an upper portion which is concentric with respect to the shaft 55 and a lower portion also concentric with respect to the shaft 55 but at a greater distance from the same. Only the connecting portion of the cam slot 142 will have a camming action upon the pin 143 when the plate 115 is moved counterclockwise as viewed in Fig. 9. The pin 143 shown is in the position it assumes when the setting lever 80 is at the "0" position and if the penny setting lever 80 should be moved to the "5" position the pin 143 will still occupy the upper portion of the cam slot 142. If the pennies amount to be subtracted is from 1 to 5, the plate 115 will be subsequently rocked counter-clockwise, the pin 143 still playing in the upper portion of the cam slot, and no movement will be imparted to the pin 143 or bell-crank 140. An example of such an operation is when 25¢ is tendered to the operator and the sale is 5¢, which subtraction does not require the elimination of a dime. However, if the pennies lever 80 should be adjacent the "5" mark so that the pin 143 occupies the upper portion of the cam slot 142 and the amount subtracted is greater than five, such as from 6¢ to 9¢, the plate 115 will be rocked counter-clockwise to such an extent that the pin 143 will play in the lower portion of the cam slot 142 which will have a direct action upon the pin 143 and bell crank 140. An example of such an operation is when 25¢ is tendered to the operator and 9¢ subtracted therefrom which requires the elimination of a dime. Another example would be when the pennies setting lever 80 is adjacent the zero position at which time the pin 143 occupies the position shown in Fig. 9. If an amount is subtracted in which the pennies denomination is from 1¢ to 9¢, the pin 143 will play in the lower portion of the slot 142 and occupy one of the nine positions and in this case the connecting portion of the cam slot will have a direct action upon the pin 143, and therefore, the bell crank 140, to perform the function of eliminating the dime. Example of this operation would be a receipt of 10¢ and a transaction of 1¢ to 9¢. In general, the pin 143 will only occupy the lower or effective portion of the cam slot 142 when the pennies value of the amount of the sale is of a greater value than the corresponding denomination of the tendered amount.

As previously stated the plate 103 is provided with two sets of projections 111. Normally, the upper set of projections are effective, but at certain times the plate 103 is raised to render the lower set effective in place of the upper set. The need of this shift may be readily understood when the problem of issuing either 72¢ or 77¢ in change is considered. In both of these cases the dimes control plate 103 would be in the same position yet the coins to be issued would be entirely different since for 72¢ the change would be a 50¢ piece, two dimes and two pennies, whereas for 77¢, one 50¢ piece, one quarter and two pennies. It will be observed from an inspection of Fig. 12 that in line with the "3" areas for the various coins (which is the tens complement of seven) there is a projection 111 on the upper bar 110 for the 50¢ piece and the two 10¢ pieces whereas the lower bar 109 is provided with projections 111 in the areas marked "3" to control the ejection of a 50¢ piece and a 25¢ piece only.

The present invention therefore, contemplates shifting the plate 103 vertically under the control of the penny change computing mechanism. If the pennies order involves change less than 5¢ the upper set of control projections 111 of the dimes control plate will be active, whereas whenever the pennies control plate 122 stands anywhere from the 5¢ to 9¢ position the lower set of projections 111 on the dimes control plate 103 will be active.

It should also be borne in mind, however, that while under certain conditions the plate 103 is lifted to bring the lower set of projections 111 in cooperation with the control arms 114 the necessity of eliminating a dime by moving the control plate 103 an additional distance is also required when the lower set of projections 111 are utilized. Therefore, it will be noted in instances which require the elimination of a dime the plate 103 may be shifted laterally to perform the necessary eliminating function when either set of projections 111 are adapted to control the issuing of the necessary coins.

Whether the upper or lower set of projections of the plate 103 are to be active is determined by the position of the plate 115 (Fig. 9) which is provided with an irregular shaped cam slot 144 acting upon a pin 145 carried by a pitman 146 (Figs. 9 and 11) whose upper forked end surrounds the sleeve 74. The lower end of the pitman 146 (Fig. 7) is connected to an arm 147 which is pivoted upon a shaft 148 carried by the supporting plate 136 (see Fig. 11). The shaft 148 referring to Figs. 7 and 11, carries at one end an arm 149 pivotally attached to a link 150 one end of which is pivotally carried by one arm of the previously mentioned bell crank 108. A pitman 151 connects one arm of the bell crank 108 and one arm of the bell crank 107. When the bell cranks 107 and 108 are in the positions shown, the pins 106 projecting in the guiding slots 105 of the control plate 103 will guide the plate 103 when it is moved longitudinally, but any lateral movement of the plate 103 is prevented by bent guiding lugs 152 and 153 (see also Fig. 5) of a bracket 154 which is attached to the machine base 41. It will be apparent that when the pitman 146 is moved downwardly the shaft 148 will be rocked so that through the arm 149 the link 150 will be moved to the right as viewed in Fig. 7 resulting in rocking the bell cranks 107 and 108, and through the pins 106 cooperating with the slots 105, will elevate the control plate 103, irrespective of the longitudinal position to which it has been adjusted. Whether or not the upper or lower sets of projections 111 are rendered active depends upon the position of the controlling plate 115 and in order to regulate the movement of the pitman 146 at the desired time the cam slot 144 is so designed as to effect the proper movement at the proper time.

It will be noted that the cam slot 144 co-acting with the pin 145 is provided with portions 155 and 156, the former being at a distance farther away from the center of the shaft 55 than the latter, so that upon an initial movement of the plate 115 (Fig. 9) in a counter-clockwise direction the cam surface just in advance of portion 155 will be effective to immediately draw down the pitman 146 and, through the connections previously described elevate the dimes control plate 103. The pin 145 cooperates with the portion 155, whenever the controlling plate assumes a position from 5 to 9 inclusive which figures designate the amount of change in pennies to be given and corresponds to the areas 5 to 9 of the control plates 122 and 130. The pin 145 occupies the position in the cam slot shown in the drawings when no pennies are to be issued, but upon a movement of the plate 115 in a counter-clockwise direction (as viewed in Fig. 9) to a position designated 5, 6, 7, 8 or 9 the pitman 146 will be drawn downwardly to render the lower set of projections 111 on the control plate 103 active.

To bring out more clearly the action of the pennies change computing mechanism, when the change to be issued is 6¢, 7¢, 8¢ or 9¢ several examples will be given.

If the amount of money tendered the operator is a dollar the dimes setting lever 70 will be adjusted to the $ position which will set the control plate 103 so that the "$" areas are in correlation with the control arms 114. The pennies setting lever 80 will, however, be placed adjacent the "0" and the plate 115 and parts connected thereto will then be in the position shown in Fig. 9. If the sale amounts to 23¢ the dimes secondary differential mechanism will move the plate 103 longitudinally to bring the areas marked "2" in range of the various control arms 114. Since the 3¢ key 10 of the pennies bank is operated it will result in moving the pennies control plates 122 and 130 three steps to the right (as viewed in Fig. 9) at which time the areas marked "7" are in range of the control arms 114 of the 1¢ and 2¢ ejecting units. The lower portion of the cam slot 142 will also act upon the pin 143 to rock the bell crank 140 thereby elevating the plate 99 to re-position the control plate 103 so that the areas marked "3" are now in range of the various control arms 114. As the plate 115 is rocked counter-clockwise, by the pennies secondary differential mechanism the pin 145 will occupy the "7" position in the cam slot portion 155, thereby depressing the pitman 146, and through the connections previously described elevate the control plate 103 so that the lower projections 111 will cooperate with the lower control arms 114. It should be noted that at this time, the areas marked "3" are still in range of the lower control arms 114 and will be effective to issue a 50¢ piece and a quarter while the pennies change controlling mechanism will be effective to issue 2 pennies from the two cents ejecting unit.

The same principle of operation is involved when a dollar is tendered and the sales amounts to 22¢ or 21¢, the only difference being in this case that the pennies change controlling mechanism will issue three pennies or four, respectively.

Similarly, if 50¢ should be tendered the operator, the positioning of the dimes setting lever 70 will give the control plate 103 a movement of five steps to the right from its normal position, and if the sale should amount to 33¢ the dimes secondary differential mechanism will give the plate 103 an additional movement of three steps or a total of eight steps. Since the pennies of the amount 33¢, which is the amount of the transaction, exceed the pennies in 50¢, the amount tendered the lower portion of the cam slot 142 acting upon the pin 143 will be effective to give the plate 103 an additional unit of movement, making a total of nine steps, thereby bringing the areas marked "9" in range of the various control arms 114. The pin 145 (Fig. 9) will, at this time, be positioned by the pennies secondary differential mechanism adjacent the point marked "7" and similarly the areas marked "7" of the pennies change control plates 122 and 130 will be in range of the various control arms to issue two pennies. Furthermore, the cam slot portion 155 will be effective to depress the pitman 146 so that the lower projections 111 (Fig. 12) of the control plate 103 will be correlated with the lower control arms 114 and at the areas marked "9" it will be noted that a single dime and nickel will be issued making a total change of 17¢.

Summarizing therefore it will be noted that whenever the change to be issued is 6¢, 7¢, 8¢ or 9¢ the lower projections 111 of the plate 103 will be active so as to properly issue the same amount as the upper set would issue, but also an additional 5 cents thus giving the required change by the least number of coins.

Attention is directed to the fact that the upper and lower set of projections 111 are not functionally correlated with the same ejecting units for the same position of the plate 103. The upper set of projections 111 are effective to issue a number of coins which are even multiples of five while the lower set of projections control the issuance of coins which are odd multiples of five. Therefore, in any given position of the plate 103 the lower set of projections 111 control the issuing of coins the value of which exceed by five the value of the coins which would ordinarily be issued under control of the upper set of projections 111. In fact the lower set of projections does not merely issue an extra 5¢ piece but gives change to include the extra 5¢ amount in the least number of coins. Thus where the upper part of the plate 103 would control the issuance of 40¢ by a quarter, dime and nickel the corresponding lower part of the plate 103 would control the issuance of 45¢ by a quarter and two dimes. Similarly 20¢ would be ejected by the upper part of plate 103 as 2 dimes but the corresponding lower part of plate 103 would issue 25¢ as a single quarter. Therefore, it will be noted that in any position of the plate 103 the change to be issued will comprise the least number of coins.

If the change to be issued ends in 1¢, 2¢, 3¢ or 4¢, the upper set of projections 111 of the plate 103 will be active since no extra 5¢ is to be issued and an example of such a transaction is a dollar being tendered to the operator and a transaction of 26¢ which requires a change of 74¢. At this time it will be noted that the cam slot portion 156 cooperates with the pin 145 so that the pitman 146 will remain in the position shown in Fig. 9 permitting the upper projections 111 of the plate 103 to control the issuance of the following coins, namely, a half dollar and two dimes.

At this time the areas marked "4" of the controlling plates 122 and 130 will be in range of the various control arms 114 so as to eject 4¢ thus issuing a total of 74¢ which is the change necessary. Similarly if the change to be issued requires three pennies, two pennies or a single penny the pin 145 will cooperate with the cam portion 156 at the points marked 3, 2 or 1 permitting the pitman 146 to remain in its normal position at which time the upper projections 111 of the controlling plate 103 will also be active.

It will also be noted that the final position of the pin 145 with respect to the portions 155 and 156 of the slot 144 depends upon the last movement given to the plate 115 by the pennies secondary differential mechanism. For instance, the positions 6, 7, 8 or 9 which denotes the amount of pennies to be issued might be obtained when the amount tendered is 75¢ and the sale transacted 69¢, 68¢, 67¢ or 66¢ respectively. At the position shown in Fig. 9 the pennies setting lever 80 is at the zero position. To exemplify the above in order to represent 75¢ the pennies setting lever 80 is moved to the "5" position which will result in moving the plate 115 clockwise (Fig. 9) until the pin 145 cooperates with a portion 158 of the slot 144. When the 6¢ key is depressed the plate 115 will be given a movement counter-clockwise equivalent to six steps which will bring the pin 145 to cooperate with the portion 155, thus depressing the pitman 146 to render the lower set of projections 111 active. Summarizing therefore, any problem involved in which the final issuance of the coins terminates in 6¢, 7¢, 8¢ or 9¢, the lower set of projections 111 of the plate 103 will be active to eject the extra 5¢.

The pin 145 may also occupy a position in the cam slot portion 155 designated as the "5" position and one way in which the pin may arrive at this particular position would be in problems which involve the receipt of a sum of money which is an even multiple of 5¢ such as 10¢ and 70¢, for example, a sale of 5¢ or 65¢ respectively. In each case it will be noted that change of 5¢ or a single nickel is required. When the dimes setting lever 70 is set to the 10¢ position the plate 103 will be given a movement of nine units. Upon a subsequent operation of the 5¢ registering key 10, the dimes eliminating mechanism will give the plate 103 an extra step of movement and the plate 115 will be moved counter-clockwise from the position shown in Fig. 9 so that the pin 145 occupies the "5" position in the portion 155 of the slot 144. This will result in depressing the pitman 146 and raising the plate 103. Since the areas marked "10" of the controlling plate 103 are now correlated with the various control arms 114 only a single nickel will be ejected.

In the second problem given which is the subtraction of 65¢ from 70¢ the only difference from the above is that the plate 103 will first be moved a number of units from its $ position which is the tens complement of "7" or to the "3" position and a subsequent depression of the 60¢ registering key will cause the usual mechanism to adjust the plate 103 to the "9" position and the dimes eliminating mechanism will also give the plate an extra step of movement bringing the areas marked "10" to cooperate with various control arms 14 and thus only a nickel will be ejected.

In handling a transaction which involves the receipt of a coin, such as 25¢, which is an odd multiple of five, and a subtraction of an amount such as 20¢ comprising an even multiple of five the pennies setting lever 80 is brought to the position adjacent the "5" on the scale 69. At the proper setting of the pennies setting lever 80 the pin 145 will occupy the cam slot portion 158 which is designed to depress the pitman 146 to render the lower set of projections 111 of the plate 103 active. A longitudinal movement of ten units will be given to the plate 103, eight units by the direct adjustment of the dimes setting lever 70 and two units by the dimes secondary differential mechanism. At the areas marked "10" the lower control arms 114 in cooperation with the lower projection of plate 103 will control the ejection of a single nickel.

A corresponding problem would be the receipt of a coin such as 25¢ and a transaction amounting to 15¢. The plate 115 will in this case be given equal reverse movements, first by the pennies setting lever 80 to bring the portion 158 to cooperate with pin 145 and then an equal opposite movement by the pennies secondary differential mechanism to bring the plate 115 so that the pin 145 again occupies the "0" position of the cam portion 157 (see Fig. 9). As a result of an elevation of the plate 103 and a subsequent depression, the upper projections 111 will be finally active. A total longitudinal movement of nine units is given to the plate 103, comprising eight units given to it by direct adjustment of the dimes setting lever 70 and one unit of movement by the dimes secondary differential mechanism to bring the areas marked "9" in cooperation with the upper control arms 114 which will control the ejection of a single dime.

In each of the above cases the pennies change control plates 122 and 130 will be finally positioned so that no pennies will be ejected. This will be understood since in the first example (or 5¢ subtracted from 10¢) in the areas marked "5" of plates 122 and 130 there are no projections 127 active and similarly at the areas marked "0" (second example or 15¢ subtracted from 25¢) there are likewise no projections 127 on either control plate 122 or 130 active.

*Coin ejectors*

The manner of positioning the various control plates to determine the issuance of the necessary coins having been explained there will now be described the character of the means which ejects the coins as controlled by the various plates.

These are necessarily of different forms due to the fact that in some instances it is necessary to eject only one coin of a particular denomination and at some other time it is necessary to eject two coins from the same stack. It is also essential at times to have the ejecting mechanism associated with the pennies ejecting units so constructed and arranged that a particular ejector may eject one coin in one instance, two coins in other cases, or none at all depending upon the particular problem at hand. Of the three forms of ejectors just referred to there will be presently described in detail the type of ejector utilized to eject a single silver or nickel coin at a time such as a half dollar, quarter, dime or nickel.

Figure 14:
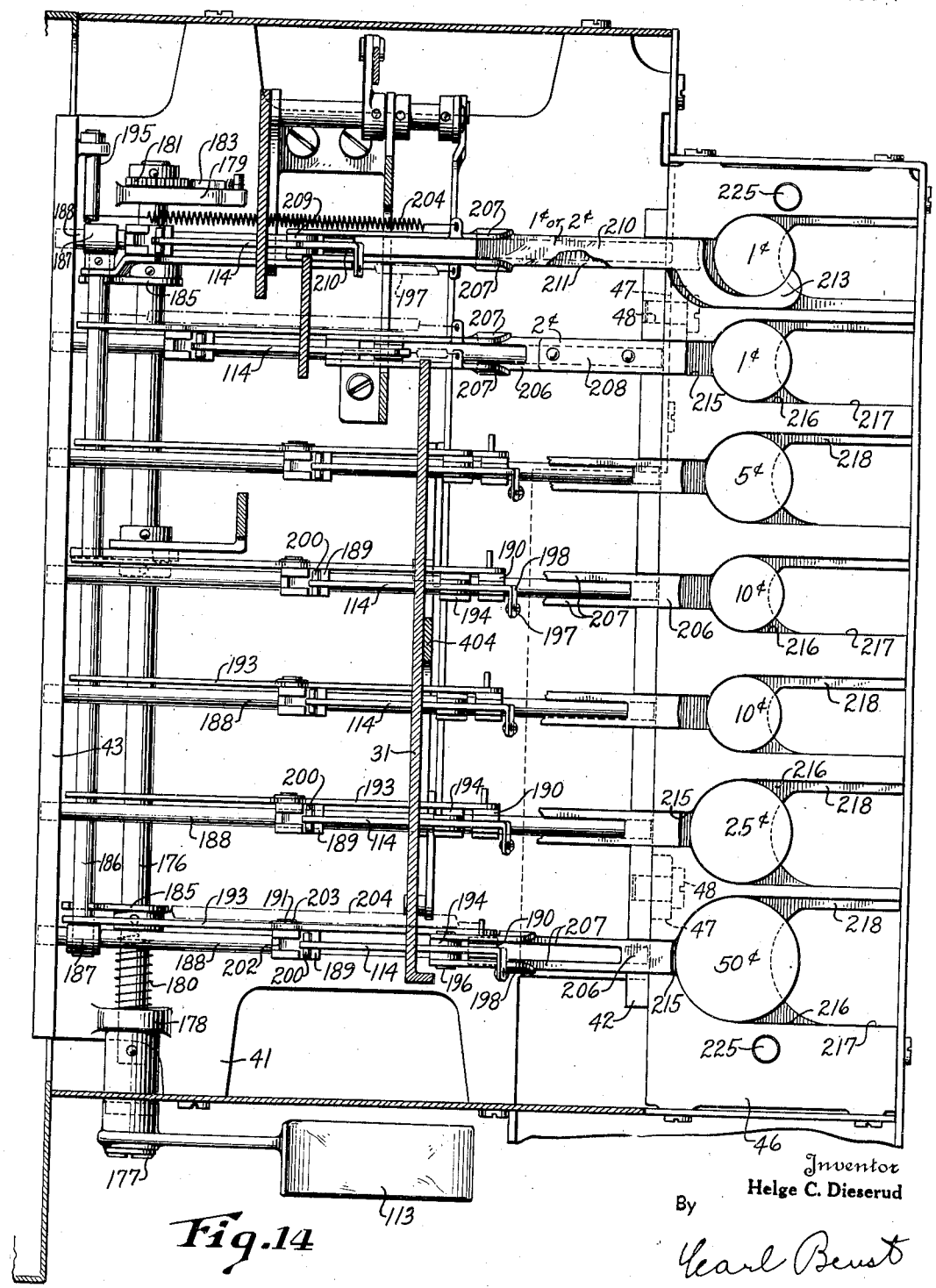
Fig. 14 is a top plan view of the change making attachment taken on the line 14—14 of Fig. 5, the casing being removed to present more clearly the various coin ejecting units and their relation to the associated control plates and the change making lever.

Referring to Figs. 1, 7 and 14, it will be noted that the previously mentioned change issuing lever 113 is detachably connected with a rock shaft 176 by a screw 177. The rock shaft 176 is journaled in ears 178 and 179 which are integral with the base 41. A coil spring 180 (Figs. 7 and 14) which has one end fastened in the ear 178 and the other to the shaft 176 is adapted to automatically return the shaft and the change issuing lever after the latter is moved downwardly to eject the desired coins. A full-stroke of the change issuing lever 113 is obtained in a manner well known in the art, that is, by having ratchet teeth 181 (Fig. 16) formed on the upper edge of a plate 182 which is secured to the rock shaft 176 co-acting with a spring-pressed full-stroke pawl 183. It will be noted that the pawl 183 is pivoted upon an upper integral extension 184 of the ear 179. Attached to the shaft 176 and extending upwardly is a pair of arms 185 (Figs. 5 and 14) which are slotted at their extremities to engage a transverse shaft 186. The shaft 186 at its extremities is carried by a pair of blocks 187 which are apertured to receive their respective supporting rods 188 which are journaled in the side plates 42 and 43. Thus, it will be evident by reason of the above construction that the shaft 186 will be given a bodily, transverse, reciprocating movement during each operation of the change issuing lever 113 to actuate the various coin ejectors.

*Single coin ejector*

The type of ejector which is utilized to eject only one coin at a time will now be described. Slidably mounted on the related rod 188 is a pair of blocks 189 and 190 (Fig. 5). Mounted adjacent the blocks 189 and 190 and attached thereto by pins 191 and 192 respectively is an arm 193 which is apertured at its end to receive the rod 186 so, it will be noted, by this construction reciprocation of the rod 186 will also impart a similar movement to the blocks 189 and 190. Loosely mounted upon the shaft 188 is a block 194 which, as shown in Fig. 20, is double-slotted at its mid-center on the opposite sides of the shaft 188 to receive a pair of the previously mentioned control arms 114 (Figs. 7, 14 and 17) said arms being pivoted to the block 194 by pins 196. A spring 197 (Fig. 5) extending between fingers 198 of the control arms 114 rocks the fingers so that they approach each other, but they are limited in this direction of movement since the fingers 198 contact with angular surfaces 199 (Figs. 5 and 21) formed in the block 190. The ends of the control arms 114, opposite to which the spring 197 is connected, are each provided with a pin 200 (Fig. 5), and an angular camming edge 201. Each of the camming edges 201 co-acts with an inclined edge 202 formed by cutting the block 189 laterally and centrally so that integral hooks 203 (Figs. 5 and 19) formed thereby will at times engage the pin 200 for a reason to be explained hereinafter.

The coin ejector, of the type of ejector now being described, comprises a slide 206 (Figs. 5 and 14) bifurcated so as to form arms 207 which are bent upwardly in planes at right angles to the plate 206 (Fig. 14). These arms are connected to the block 194 by the upper pin 196. A spring 204 (Fig. 5), extending between the one of the arms 207 of the slide 206 and a cross rod 195 attached to the side plate 43, is adapted to hold the block 190 and parts attached thereto in the positions shown in Fig. 5, at which time it will be noted that a portion of the block 194 contacts a cross pin 205 attached to the shaft 188.

It will be remembered that whether or not a coin is issued depends upon the correlation of a projection 111 of the control plate 103, for example (Fig. 5), with respect to the control arm 114 of a particular ejector, and if the plate 103 is so positioned that one of the projections 111 thereon is in alignment with a control arm 114, a coin will be issued. As previously stated, either the upper or lower projections 111 on the plate 103 are adapted to control the ejecting of some coins, and the manner in which a 50¢ coin is ejected will now be described.

Assuming that one of the upper projections 111 of the plate 103 is in alignment with the upper control arm 114 of the 50¢ ejecting unit (shown in Fig. 5), and is retained in this position, it will be obvious that when the coin ejecting lever 113 is moved downwardly the rod 186 will be moved horizontally towards the right from the position shown in Fig. 5. This will result in a corresponding movement of the arm 193 moving the cross blocks 189 and 190 to the right. When the block 190 moves to the right it will withdraw the angular surface 199 from the finger 198 of the control arm 114 (Fig. 5) so that the spring 197 will tend to rock the upper arm 114 counter-clockwise. Since it was assumed that a projection 111 of the control plate 103 was over this control arm 114, this rocking action of the upper arm will be prevented, and during the initial movement of the blocks 189 and 190 no movement will be imparted to the block 194, or to the control arm 114, until the bevel edge 202 of the block 189 contacts the angular camming edge 201 of the control arm 114. Just prior to this contact the pin 200 will be caught under the upper hook 203 of the block 189. Therefore, it will be obvious that the upper control arm 114 will now be positively locked to the block 189 so that continued movement of the coin issuing lever 113 will move the parts of the 50¢ coin ejecting mechanism as a unit, and during this time the coin ejecting slide 206 contacting with the periphery of a 50¢ coin will slide the latter towards the right (Fig. 5), after which it will fall and be deposited in a receptacle to be described in detail hereinafter.

Asssuming now that one of the recesses 112 (Fig. 7), adjacent a projection 111 of the control plate 103, is in alignment with the upper control arm 114, it will be obvious that the initial movement of the block 190, as heretofore described, will permit the spring 197 (Fig. 5) attached to the fingers 198 of the control arms 114 to rock the upper arm 114 clockwise. It will also be recalled that the block 189 also moves simultaneously with the block 190, but due to the fact that the block 190 is normally closer to the pivotal stud 196 of the controlling block 194 than the block 189 a small movement of the block 190, and therefore the finger 198 will, under the circumstances just described, permit a larger angular displacement of the other extremity of the control arm 114 so that this end will be immediately raised upwardly before the hook 203 can catch over the pin 200. Continued movement of the blocks 189 and 190 will permit further clockwise movement of the control arm 114, but since the block 194 is not engaged by or connected to the blocks 189 and 190 the coin ejecting slide 206 will not, in this instance, be moved and the block 194 and slide 206 will stay in their normal positions.

It will be noted that as the blocks 189 and 190 are restored to their normal position the bevel surface 199 co-acting with the underside of the finger 198 will positively cam the arm 114 to its normal position against the action of the spring 197. Thus it will be obvious that while the control arm 114 is moved by the spring 197 to its inoperative position, it is positively restored to its normal position.

As previously stated, the lower projections 111 of plate 103 are also adapted to control the ejection of the 50¢ coins by the ejecting unit just described and the operation of the coin ejecting mechanism when controlled by the lower projections 111 is the same as previously described with the exception that the lower projections 111 of the plate 103 will control the lower control arm 114 and in a similar manner. Of course, if no projections 111 are in alignment with either of the control arms 114 they will be both swung oppositely by the spring 197 to the positions they assume where they are intended to be ineffective thus preventing the ejection of coins.

In some cases it may be desirable to dispose with the hooks 203 and pins 200 so that the direct co-action of the horizontal edges of the control arms 114 and the horizontal edges of the projections 111 will retain the control arms 114 in their operative positions.

However, it is preferred to utilize the hooks 203 and pins 200 since the hooks 203 will cam the pins 200 slightly so as to eliminate any frictional contact or wear between the horizontal edges of the projections 111 and the edges of the arms 114.

The type of ejecting mechanism just described is (as shown in Fig. 9) utilized for ejecting coins (one at a time) of the following amounts: 50¢, 25¢, 10¢ (both stacks) and 5¢, all of which cooperate with the control plate 103.

*Two pennies ejector*

A special ejecting unit is also provided for ejecting two pennies simultaneously and this mechanism will now be described. Referring particularly to Fig. 18, it will be noted that this ejecting unit is similar to that described heretofore with the exception that it is provided with only one control arm 114 adapted to cooperate with either the projections 132 or depressions 133 of the previously mentioned plate 130. The spring 197 associated with the two pennies control arm 114 is connected to the finger 193 of said arm and to a pin carried by the associated block 190 as shown in Fig. 18. The ejecting slide 206 in this case has attached thereto a supplemental slide 208 and the combined thickness of the slides 206 and 208 is sufficient to eject two pennies simultaneously.

*Single penny or two pennies ejector*

The third type of coin ejecting unit is adapted, as premised hereinbefore, to eject either a single penny, two pennies or none depending upon the particular problem involved. This type of ejector is clearly illustrated in Fig. 17, where it will be noted that two control arms 114 are provided, but each control arm is pivoted by a pin 196 upon its respective cross bar 209 and 210. Pivoted by its respective cross pin 196 is a pair of special ejecting slides 211 and 212 each of which is of sufficient thickness to eject a single penny.

As will be observed in Figs. 14 and 17 the upper ejecting slide 211 is formed with a curved finger 213 partly encircling the second penny in the stack and the purpose of this construction will be presently explained. The arms 114 are adapted to cooperate with the upper and lower projections 127 of the control bars 126 and 125 of the control plate 122. Each slide 211 and 212 has connected thereto a restoring spring 204 adapted to return the slides and cross bars 209 and 210 to their normal positions, the return movement being stopped by a cross pin 205 previously referred to. The springs 197 (Fig. 17) of the 1¢ or 2¢ control arms 114 are connected to the fingers 198 of said arms and to ears on one of the forks 207 of each of the slides 211 and 212.

It will be obvious that when one of the lower projections 127 of the control plate 122 is in alignment with the lower control arm 114 that this arm will be rendered operative in a manner hereinbefore described, so that upon further movement of the shaft 186 the lower ejecting slide 212 will eject a single penny, the block 210 at this time sliding upon the shaft 188 away from the block 209 which is, at this time, stationary and held in the position shown in Fig. 17 by the related spring 204. If the ejecting slide 212 was similar to the slide 211, the frictional force between the first two pennies might be so great that when the lower slide 212 is actuated to eject the lowest penny in the stack, the upper penny might also be carried along and ejected. To prevent this the curved finger 213 is provided and it will be obvious that when the slide 211 is held in its normal position by the spring 204 the second penny in a stack will be held and thus only a single penny will be ejected.

In the event it is desired to eject two pennies simultaneously, the pairs of projections 127 of the slide 122 will simultaneously co-act with both arms 114 thus retaining them in positions where they are operative to control the ejection of two coins. During this operation it will be evident that both arms 114 will be locked to the block 189 so that blocks 209 and 210 will be moved simultaneously thus actuating the coin ejecting slides 211 and 212 to expel two pennies.

*Coin receiver*

As is best shown in Figs. 5 and 14, the side plate 42 and bracket 46 are formed with a series of rectangular slots 215 in which the associated coin ejecting slides play and which extend into coin slots 216. The slots 215 and 216 are substantially a depth equivalent to the thickness of the coins to be issued. In connection with the ejecting slide 206 associated with the 50¢ piece and which in the present machine is of the greatest diameter of the various coins, the ejector slide actuating mechanism is so proportioned that it is capable of giving the 50¢ ejector slide 206 a movement equivalent to the diameter of a 50¢ coin.

Since it is only necessary to give any coin ejecting slide a movement equal to the diameter of its related coin, a lost motion is provided for the slides associated with coins smaller in diameter than the 50¢ coin. This, in the present embodiment, is effected by constructing the length of the coin ejecting slides 206 for ejecting the following coins, 25¢, 10¢ and 5¢, less than the 50¢ coin ejecting slide (see Fig. 14). In a similar manner this lost motion is also provided for the slides 206 and 208 for ejecting multiple pennies as well as the slide 211 (Fig. 17) for ejecting a single penny.

The bracket 46 is provided with a series of apertures 217 (Fig. 14) each of which is formed with a ledge 218 so that as a particular coin is ejected sufficiently, the ledge will insure that the coin will be dropped downwardly through the aperture 217 at an angle so that the edge thereof will strike a slide 219 (Fig. 15) to be guided into the open trough of a coin receptacle 220. The slide 219 attached to the bottom of the chute 220 may be made of any suitable material adapted to deaden the sound of impact as the coins drop, and the preferred construction comprises wood veneer, but if so desired, may be formed of rubber, fiber or any other material having the desired sound-deadening qualities.

As best shown in Figs. 15 and 15A the coins are stored in stacks and to hold the stacks of coins in their proper positions there is provided a coin receptor comprising a back plate 222 and lower and upper over-hanging plates 221 and 223 respectively. The over-hanging plates 221 and 223 are apertured to receive coin tubes 224 which are secured at their extreme ends to the over-hanging plates 221 and 223 by any suitable means, such as soldering, riveting, etc. The coin receptor may be held relative to the bracket 46 by any suitable means, such as locating pins 225 (Fig. 15) carried by the bracket 46 passing through holes formed in the over-hanging plate 221. At the upper part it may be held fixed by a screw 226 (Fig. 5) passing through the coin cabinet 73 and into a bent extension 227 (Fig. 5) integral with the back plate 222 of the coin receptor.

The coins may be locked against access by a cover 228 (Fig. 1) hinged at 229 (Fig. 15) and locked by a suitable lock, such as that shown in Fig. 1, and indicated by reference character 230. In order that the number of coins in the different stacks may be readily observed the hinged cover 228 is provided with a glass window 231 (Figs. 1 and 5). Attention is directed to the fact that when the coin issuing lever 113 is moved downwardly to issue the coins, the hand which operates it will, at the termination of its downward stroke be adjacent the trough in the coin receptacle 220, so that the hand may be removed from the coin issuing lever 113 (which is then automatically returned by the coin spring 189) and conveniently placed in the coin receptacle 220 to obtain the ejected coins.

*Locks and interlocks*

The machine is preferably provided with interlocks between the various manually operable elements which prevent the simultaneous operation of two or more of them and thus prevent any irregular operations of the machine.

*Interlock between change issuing lever and cash register keys*

One of these interlocks comprises an interlocking mechanism between the driving shaft 37 (Figs. 5 and 7) of the machine and the change issuing lever 113 and is provided to prevent a simultaneous operation of both the cash register keys 10 and the change issuing lever 113. Attached to the shaft 176 is a plate 235 formed with a cam slot 236 engaging a pin 237 carried by a shiftable locking bar 238. The locking bar 238 is bifurcated at its lower end to straddle the shaft 176, at its upper end is bifurcated to straddle the shaft 37. At its upper end it carries a square pin 239. Fast on the shaft 37 which makes a complete revolution each time the cash register keys 10 are operated is a disk 240 having a notch 241 (Fig. 7) adapted to cooperate with the square pin 239. As soon as the shaft 37 starts revolving by depression of the cash register keys 10 the slot 241 in the disk 240 moves out of alignment with the pin 239 thereby locking the bar 238 and preventing an operation of the change issuing lever 113.

In the event that the change issuing lever is initially depressed the co-action of the pin 237 with the cam slot 236 in the locking plate 238 will positively cam the locking bar 238 upwardly so that the pin 239 will enter the slot 241 in the disk 240 and thereby prevent rotation of the shaft 37 which, through mechanism previously described, will lock the cash register keys 10 against manipulation. The slot 236 is so designed that an initial movement of the change issuing lever 113 will immediately cam the bar 238 upwardly to lock the keys so that as the pin 237 engages the concentric part of the slot 236 the bar 238 will be held in its locking position during a continued operation of the change issuing lever 113. Return movement of the lever 113, will of course, positively return the bar 238 to its normal or unlocking position.

*Aligning mechanism for change setting levers.*

To align the change setting levers 70 and 80 there is provided a supporting plate 242 (Fig. 8) which is apertured to receive the shaft 37 and the sleeve 65. Loosely pivoted upon the plate 242 by a pin 243 is an aligning lever 244 which is urged by a spring 245 so that a pin 246 carried thereby co-acts with one of two notches 247 (Fig. 7) formed on the pennies setting lever 80 and which corresponds to the "0" and "5" setting of said setting lever 80. As shown in Fig. 5 the pin 246 is of a length sufficient to also co-act with one of a series of notches 248 formed on the extension 71 of the dimes setting lever 70 which notches correspond to the different positions of adjustment of said setting lever 70. The co-action of the pin 246 with the notches 247 and 248 will adjust and align the setting levers 70 and 80 in their proper positions.

*Means for locking change issuing lever when change settings levers are improperly adjusted*

As shown in Fig. 8 the aligning lever 244 is extended to form a locking shoulder 249 provided a locking edge 250 concentric with respect to the pin 243. It will be clear that when either of the setting levers 70 or 80 is improperly set the aligning lever 244 will be rocked sufficiently so that the shoulder 249 thereof is moved so as to be in the path of the square pin 239 and thus prevent any movement of the change issuing lever 113. This will automatically indicate to the operator that an improper positioning of one of the levers 70 or 80 has been effected and by subsequently adjusting the setting lever or levers properly to bring the pin 246 in alignment with the desired notches 247 or 248 the aligning lever 244 will be urged by the spring 245 to its proper position so that the change issuing lever 113 is released for operation.

The above described mechanism operates conversely, that is, it prevents any movement of the amount setting levers 70 or 80 out of their adjusted positions during an operation of the change issuing lever 113. As previously stated, when the change issuing lever 113 is operated the pin 239 will pass into the notch 241 of the disk 240 and when the pin 239 is moved from its normal position by operation of the change issuing lever 113 one vertical side thereof will co-act with the shoulder 249 of the aligning lever 244 thus locking the aligning lever 244 and, therefore, the setting levers as long as the pin 239 is away from its normal position. In the positions of the parts shown in Fig. 8, the aligning lever 244 is free for movement when the setting levers 70 and 80 are being adjusted to their different positions since it will be evident that the locking edge 250 is concentric with respect to the pin 243 and will not interfere with the pin 239. If the pin 239 is away from its normal position any movement of the change setting levers will be prevented by the co-action of the shoulder 249 with the pin 239.

*Means for locking and unlocking change setting levers*

As previously stated in order to directly adjust the different coin control plates 103, 122 and 130 by adjustment of the setting levers 70 and 80 it is necessary to have the setting levers normally unlocked to permit their adjustment from one position to the other, and to have the associated segments 67 and 66 (Figs. 7 and 10) normally locked to provide the proper differential movement of the control plates. To provide for this there is provided a locking bail 251 (Figs. 5 and 10) one arm 252 (Fig. 10) of which is bifurcated at 253 to straddle the shaft 55 and is further bifurcated at 254 to straddle the driving shaft 37 and this portion of the arm is provided with a roller engaging the race of a box cam 255 attached to the driving shaft 37. The other arm 256 of the locking bail (Figs. 5 and 7) is bifurcated (similar to the bifurcation 253) to straddle the sleeve 65. The underside of the bail 251 is provided with a plurality of integral locking projections 257 and 258 (Fig. 5) each of which is in the plane of its respective segment 66 and 67 and adapted to normally co-act with aligning and locking teeth 259 formed on the peripheries thereof, as best shown in Figs. 7 and 10. The upper edge of the locking bail 251 is also provided with a locking projection 260 (Fig. 10) which as shown in Fig. 5, is of a dimension sufficient to co-act with aligning teeth 261 formed on the underside of both segmental extensions 71 and 79 of the setting levers 70 and 80, respectively.

Normally (Fig. 10) the locking projections 257 and 258 are in engagement with the aligning teeth 259 of the segments 66 and 67 and the locking projection 260 is out of engagement with the locking teeth 261 of the extensions 71 and 79 so as to permit adjustment of the setting levers 70 and 80 to directly position the coin control plates. During the initial operation of the machine the cam 255 (Fig. 10) will actuate the locking bail 251 to disengage the projections 257 and 258 from the aligning teeth 259 and thereby unlock the segments 66 and 67, and, therefore, the shaft 55 and sleeve 65 movable therewith. By the connections previously described this will unlock the arms 58 and 33 (Fig. 2) so as to permit their differential positioning by the cash register keys 10 as previously described to readjust the change control plates 103, 122 and 130.

When the locking bail 251 is moved to unlock the segments 66 and 67 the locking projection 260 will engage the teeth 261 of the segmental extensions 71 and 79 of the setting levers 70 and 80 thereby locking them against adjustment during the time that the secondary differential mechanisms are adjusting the coin control plates 103, 122 and 130 and will retain the setting levers locked until the coin control plates are properly positioned, the race of the box cam 255 being so designed as to accomplish this. During the final operation of the keys the cam 255 will actuate the bail 251 reversely disengaging the locking projection 260 from the teeth 261 thus unlocking the setting levers 70 and 80 and concurrently locking the segments 66 and 67. Therefore, it will be evident by the construction just described, that the locking bail 251 co-acts with the various change setting levers 70 and 80 so that they are locked when necessary and unlocked at the proper time to permit the proper adjustment of the coin control plates both by the keys 10 and setting levers 70 and 80.

The aliner 260, therefore, provides a means for making an incorrect setting of 103 impossible. It is obvious that 257—260 will be in alignment with either 295 or 261 at all times. Thus when 70 is adjusted, 66 is locked against movement, and also when 66 is adjusted 70 is locked against movement. If the aligner 257—260 were not provided then it would be possible that, for example, the adjustment of 70, through pinions 85 and 86, would also rock 66. But, as stated above, in the present machine this is impossible because 261 locks either 66 or 70 when the other is adjusted.

*Summary of operation when machine is used as a change making machine*

Having thus described the various parts that go to make up the complete invention and having described the operation of the different parts by citing a number of examples, a résumé of the general operation of the machine will now be given to refresh the memory as to the operation and function of the various parts.

It will be assumed, for example, that the operator has received 75¢ in change and a transaction of 67¢ has been made. He will first adjust the dimes setting lever 70 (Fig. 1) adjacent the "7" mark and also position the pennies setting lever 80 adjacent the "5" mark on the scale 69.

Referring to Fig. 10 it will be noted that the segment 66 is normally locked by the co-action of the locking lug 257 with one of the teeth 259 so that as the dimes setting lever 70 is moved upwardly the segment 75 will drive the gear 86 clockwise and the gear 85 counter-clockwise and since the segment 66 is stationary, it will move the plate 87 to the right, (as viewed in Fig. 10) and through the intermediate slides 90 and 99 will move the control plate 103 three steps to the right to bring the areas marked "3" over the various control arms 114.

Similarly, referring to Fig. 7, the segment 67 is normally locked by the co-action of the lug 258 of the locking bail 251 with one of the notches 259 so that when the pennies setting lever 80 is moved downwardly the segment 82 will rotate the gear 117 counter-clockwise and the gear 116 clockwise resulting in moving the plate 115 to the left, as viewed in Figs. 7 and 9.

Referring to Fig. 9 it will be noted that the five steps of movement given to the control plates 122 and 130 will bring the areas marked "5" in range of the various control arms 114 associated with the pennies ejecting units.

Since the amount received is now represented by the setting of the levers 70 and 80 and the control plates 103, 122 and 130 correspondingly adjusted the operator will next depress the proper registering keys 10 which comprise, in the example given, the 60¢ key in the dimes bank and the 7¢ key in the cents bank. As the 60¢ key is depressed, the associated differential frame 30 (Fig. 2) will rock the bail 50, arm 49 (Fig. 4) and link 51 rearwardly and by means of the scissors action between the lever 54 and arm 52 produced by the operation of the arm 60 by cam 63 and rearward movement of the link 51, the arm 58 will be moved a distance of six steps from its normal position.

When the shaft 37 commences its rotation caused by the registering keys, the cam 255 (Fig. 10) will rock the bail 251 so as to unlock the segments 66 and 67 (Fig. 7) and will bring the locking projection 260 (Fig. 10) to coact with one of the locking notches 261 of the extensions 71 and 79 (Fig. 7) thus locking the pennies and dimes setting levers 80 and 70 respectively, and preventing their adjustment out of the positions they have been moved to. When the arm 58 is moved differentially, the rod 55 will be moved correspondingly so as to force the segment 66 to the right, as viewed in Fig. 10, and through the planetary gear differential mechanism and the slides 90 and 99, the control plate 103 will be moved an additional six steps, commensurate with the key depressed, now bringing the areas marked "9" in range of the various control arms 114. Also in a similar manner when the 7¢ key in the cents bank is depressed, the differentially operated frame 30 (Fig. 2) associated therewith will adjust its corresponding arm 48 and link 40 so that by means of the scissors action between the members 34 and 57, the associated arm 33 will be given a differential movement, or that of seven steps, commensurate with the depressed key. This will rock the sleeve 65 (Fig. 2) resulting in a corresponding adjustment of the segment 67 (Fig. 7). Movement of the segment 67 in a counter-clockwise direction (as viewed in Fig. 7) will drive the gear 116 clockwise and the gear 117 counter-clockwise and by co-action of the latter with the stationary and locked gear segment 82 the plate 115 will be moved to the right, as viewed in Fig. 9, resulting in a corresponding movement of the plates 122 and 130. This will now bring the arms marked "3" in range of the control arms 114 associated with the pennies ejecting units.

The counter-clockwise movement of the plate 115 will result in the co-action of the lower portion of the cam slot 142 (Fig. 9) with the pin 143 thereby rocking the bell crank 140 and through the pin 139 co-acting with the horizontal slot 138 will raise the slide 99 thereby giving the control plate 103 an additional movement to the right as viewed in Fig. 12. This will now bring the areas marked "10" in range of the control arms 114 of the ejecting units associated with the plate 103.

Furthermore, the pin 145 will co-act with the cam slot 155 resulting in depressing the pitman 146, rocking the arm 147 (Fig. 7) and shaft 148. Through the arm 149, the link 150 and pitman 151, the bell cranks 107 and 108 will be rocked so that by the co-action of their respective pins 106 with the elongated slots 104 and 105, the plate 103 will be elevated. This will bring the lower projections 111 included in the areas marked "10" in cooperation with the lower control arms 114 of the ejecting units associated with the plate 103 at which time it will be noted that a single projection 111 is correlated with the arm 114 of the 5¢ ejecting unit. In the case with the pennies control plate 122 there will be a single projection 127 of the lower bar 125 of the extension 123 cooperating with the arm 114 of the 1¢ ejecting unit, and, furthermore, there will be a projection 132 of the plate 130 in cooperative relationship with the control arm 114 of the 2¢ ejecting unit.

Since the change control plates have been differentially positioned and the keys returned to normal the operator will next depress the change issuing lever 113 to issue the necessary change. It will be noted, furthermore, referring to Fig. 8, that during an operation of the registering keys 10 this could not be done due to the fact that the periphery of the disk 240 was in locking relationship with the pin 239 of the bar 238 thereby locking the change issuing lever 113 until the driving shaft 37 is brought to its normal or home position at which time the pin 239 will be in direct alignment with the slot 241 of the disk 240. Furthermore, an improper positioning of either the pennies or dimes setting lever will result in rocking the aligning lever 244 sufficiently so that the locking shoulder 249 thereof will be in locking relationship with the square pin 239 thereby preventing any movement of the change issuing lever 113 until the improperly adjusted setting lever 70 or 80 is brought to its proper position. When both of these conditions have been obtained the change issuing lever 113 may be operated. When the latter is moved downwardly it will result in rocking the shaft 176 (Fig. 5) and through the connected upstanding arms 185 move the shaft 186 to the right as viewed in Fig. 5. At the same time the pin 237 (Fig. 5) co-acting with the cam slot 236 will elevate the locking plate 238 thereby bringing the pin 239 in locking relationship with the notch 241 and locking the driving shaft 37 and keys during the time a movement of the change issuing lever 113 is being effected. Positioning of the pin 239 in front of the locking shoulder 249 by movement of the change issuing lever 113 will also lock the aligning lever 244 to prevent the setting levers 70 and 80 from being brought out of their positions of adjustment.

Referring particularly to Fig. 18, it will be noted that when the shaft 186 is moved to the right the blocks 189 and 190 will be moved in the same direction along the rod 188 but since a projection 132 of the plate 130 is over the control arm 114 carried by the block 194 it will hold the latter downwardly so that its pin 200 may be caught by the hook 203 thereby locking the block 194 to the blocks 189 and 190. This will result in moving the ejecting slides 206 and 209, connected to the block 194, to the right so that their cooperation with the two lower pennies in the stack will eject them so that they will fall down through the aperture 218 (Fig. 14) down on the slide 219 (Fig. 15) and into the coin receptacle 220. Since a projection 127 of the bar 125 is functionally correlated with the lower control arm 114 (Fig. 17) of the one or two pennies ejector unit this arm will also be caught by its respective hook 203 of the associated block 189 thereby moving the lower ejecting slide 212 similarly to eject a single penny so that it will fall down into the receptacle 220. In this case it will be noted that since the upper control arm is not functionally correlated with any projection but cooperates with a notch 126 instead, the spring 197 connected to the arm 114 will immediately rock the arm 114 to prevent its pin 200 from being caught by the associated hook 203 and, therefore, no movement will be imparted to the upper slide 211 and the latter will be retained in its normal position by its spring 204, and in fact any tendency of the lower penny which is ejected to carry along with it the penny super-imposed due to frictional contact, will be prevented by the finger 213 (Fig. 14) which partially encircles the second penny from the bottom.

It will also be recalled that the control plate 103 is so positioned that a single projection 111 cooperates with the control arm 114 of the 5¢ ejecting unit so that this relationship will cause the associated control arm to be rendered operative whereby the 5¢ ejecting unit will cause ejection of a single nickel giving the total change issued as 8¢ which is the amount necessary.

Attention is also directed to the fact that the type of cash register to which the present improvements have been applied is usually provided with a cash drawer (Fig. 1) which is ejected outwardly under the action of a suitable spring during each operation of the registering keys 10 so that the amount received may be placed in suitable compartments in the cash drawer. After the operator has deposited the money received in the cash drawer he will subsequently depress the change making lever 113 to eject the coins required so that at the termination of the downward movement of the latter it will be adjacent the open receptacle 220. The hand may be freed from the lever and conveniently placed in the receptacle to obtain the coins ejected. The change issuing lever 113 will then be automatically returned to its normal position by the coil spring 180.

By operations similar to the above, the change making mechanism will control the ejection of coins which represent the difference between the amount set on the scale 69 and the value of the keys operated so that without any mental calculation on the part of the operator the correct change will always be issued.

At the termination of the day's business, it is desirable to remove the coin receiver from the attachment and place it in a vault for safe keeping. In the present instance the coin compartment is intended to be normally locked by the lock 230 (Fig. 1) and when this is unlocked and the hinged cover 229 opened the coin receiver may be withdrawn by unscrewing the screw 226 and subsequently withdrawing the coin receiving unit from the cabinet. Coins may be placed in the coin receiving unit when the supply becomes low by merely dropping them into related coin receiving tube 224.

*Operation of machine when employed as a coin deliverer*

As previously stated the machine may be employed in another manner, that is, for delivering coins according to the predetermined setting of the amount setting levers 70 and 80. When the machine is operated in this manner it is only necessary to set the pennies and dimes setting levers 80 and 70 respectively to positions which designate on the scale 69 the value of coins to be ejected. A subsequent operation of the change issuing lever 113 will then deliver coins corresponding to the amount required.

The setting of the dimes control plate 103 and the pennies control plates 122 and 130 is precisely the same as when the machine is used as a change maker, but there will, of course, be only one positioning of the respective coin control plates so that direct adjustment of the latter will determine the coins to be issued. It might also be pointed out in passing that the action of the mechanism, when subtractive transfers and the ejection of an additional 5¢ are necessary, is exactly the same as heretofore described.

Attention is directed to the fact that in the previous description the pennies setting lever 80 was described as having only two positions of adjustment which indicate that the amount to be issued will be either an odd multiple of five or that it will be an even multiple of five, and in the latter case an extra nickel will be ejected. It is desirable at times to have the machine so arranged that pennies may also be directly issued, with or without the additional 5¢ and in order to provide for this a slight alteration in the segmental extension 79 (Fig. 7) and the scale 69 is necessary. Positions intermediate the "0" and "5" on the scale 69 will, in this case, be marked to designate the setting of the pennies lever to indicate that pennies to be issued will be 1, 2, 3, or 4. It is also essential that the segmental extension 79 (Fig. 7) be provided with additional aligning notches 247 corresponding to the next intermediate position of the setting lever 80.

As previously stated, when the machine is used as a change maker the pennies setting lever 80 has only two positions corresponding to either "0" or "5" and when the lever is in any intermediate position the change issuing lever 113 will be locked against movement. Therefore, by providing additional aligning notches 247 the pennies setting lever 80 may not only be aligned to any of the six different positions but the change issuing lever 113 will also be unlocked in any of these positions. It should also be stated that additional aligning notches 261 (Fig. 7) which coact with the locking lug 260 may also be provided to take care of locking the pennies setting lever in any of the desired positions in the event that the cash register keys 10 might be inadvertently depressed.

When the machine is altered in this manner the pennies control plates 122 and 130 may be directly positioned intermediate the "0" and "5" so that the issuance of the desired number of pennies will be controlled.

When the machine is altered and constructed in the manner indicated above, it will have many applications in commercial establishments and among the many uses may be cited the issuance of coins which comprise part of a payroll, and in fact, when the modified form of the machine is employed it may be used in stores and other mercantile establishments to tender to the customer money equivalent to the sale of goods formerly purchased and returned for credit.

While the form of mechanism herein described is admirably adapted to fulfill the objects primarily stated, it is to be understood that it is not intended to confine the invention to the one form or embodiment herein shown, since it may be embodied in various forms, all coming within the scope of the claims which follow.

What is claimed is:

1. In a machine of the class described, the combination of coin ejectors, a units and a tens control plate each or both adapted to render a plurality of said ejectors operative, levers representing the amount received adapted to adjust the control plates to render certain ejectors operative, a series of keys adapted to readjust said plates whereby other ejectors are rendered operative, an operating part, and means actuated thereby for operating the ejectors, said means being rendered operative in accordance with the final position of the control plates.

2. In a machine of the class described, the combination of an adjustable control plate having projections and depressions, a plurality of coin ejectors rendered operative by said projections, means separately operable according to an amount received and amount of purchase to impart movement in the same direction to said plate, and separate operable means to operate the ejectors rendered operative by said plate in its final adjustment.

3. In a money handling machine, the combination of a plurality of ejecting mechanisms, a units and a tens denomination control plate for controlling said ejecting mechanisms, levers adjustable for differentially adjusting the control plates, keys in banks of nine for further differentially adjusting the control plates, and actuators for the money ejecting mechanisms to cause the ejection of money in accordance with the final position of said plates.

4. In a money handling machine, the combination of money ejecting mechanism including a series of coin ejectors, a unit and a tens denomination control plate each or both adapted to render a plurality of said ejectors operative, levers adjustable for differentially adjusting each control plate in accordance with minuend values, keys in banks of nine for differentially adjusting the control plates in accordance with subtrahend values, and separate operable means to operate the ejectors rendered operative by the control plates in their final positions.

5. In a coin controlling mechanism comprising a units control plate and a tens control plate, both plates being movable to positions indicating a certain amount; a member included in the units plate moving mechanism and connected to the units control plate; and means under control of said member for readjusting the tens control plate when the units control plate occupies a predetermined position.

6. In a coin controlling mechanism comprising a units control plate and a tens control plate, both plates being movable to positions indicating a certain amount, said tens control plate being adjustable in steps to vary the indicated amount by a predetermined amount; a member included in the units plate moving mechanism and connected to the units control plate; and means under control of said member for giving the tens control plate a step of movement when the units control plate occupies a predetermined position.

7. In a coin controlling mechanism comprising a series of ejectors; a tens control plate having a position in which the plate is adapted to render certain ejectors operative, but adjustable to render certain other ejectors operative; a units control plate; units control plate moving means; and means cooperable directly with the units control plate moving means for readjusting the tens control plate.

8. In a coin controlling mechanism comprising a tens control plate capable of being moved longitudinally or vertically, means whereby said plate may be given a units longitudinal movement or moved vertically, a units control plate, adjusting mechanism for the units plate including a member, and means whereby said member actuates said means to move the tens control plate either vertically or longitudinally.

9. In a coin controlling mechanism comprising a tens denomination control plate indicating a certain value when in one position and indicating another value when in another position, means for moving the plate from one position to the other, a units denomination control plate, setting means for said units denomination control plate, and means whereby the setting means operates said moving means when the units control plate setting means moves into predetermined position.

10. In a coin controlling mechanism comprising a tens denomination control plate adapted to indicate values, means for moving said plate to indicate a lesser value, a units control plate, means for moving said units control plate, and means coupling said units control plate moving means and the tens control plate whereby the tens control plate is positively given one unit of movement by the unit plate moving means when said moving means is in predetermined positions.

11. In a coin controlling mechanism comprising a plurality of coin ejectors adapted to effect the delivery of coins, a tens denomination control plate adapted to select certain ones of the ejectors, a tens setting lever adapted to represent the tens amount received, means whereby the setting lever directly adjusts the tens denomination control plate, a units setting lever, a units denomination control plate adapted to select certain ones of the ejectors, means whereby the units setting lever adjusts the units denominational control plate to indicate the units value of the amount received, and means associated with the units control plate setting means and the tens control plate whereby the units control plate setting means positively shifts the tens control plate to effect subtracting transfers.

12. In a change making machine, the combination of a tens control plate adapted to control the ejection of coins, settable to one position in which it controls the ejection of coins of even multiples of five and settable to another position in which it controls the ejection of coins of odd multiples of five, a units control plate, setting means therefor, and means whereby the units plate setting means controls the position of the tens control plate.

13. In a change making machine, the combination of a tens control plate adapted to be moved longitudinally to a position where it controls the ejection of coins of even multiples of five and capable of being moved vertically to control the ejection of coins of odd multiples of five, a units control plate, positioning means therefor, and means whereby the positioning means for the units control plate also controls the positioning of the tens control plate either longitudinally or vertically.

14. In a coin handling machine, the combination of a plurality of setting levers adapted to represent the amount received, means actuated by the levers, plates adapted to control the delivery of coins adjusted by said means, means including a series of keys also adapted to control the adjustment of the plates, coin ejectors rendered selectively operable by said control plates, manual means operable independently of said levers and keys for operating the selected ejectors, and means operable by said levers when they are out of proper adjusted position for blocking the operation of the manual means.

15. In a coin handling machine, the combination of a plate adapted to control the delivery of coins, means including a bank of keys to adjust said control plate, a plurality of ejectors rendered selectively operable by said control plate, ejector actuating mechanism to actuate the selected ejectors, and an interlocking mechanism between the keys and the ejector actuating mechanism comprising an element rotatable by the keys and a member shiftable by the ejector actuating means, said element and member being cooperable to prevent simultaneous operation of the keys and the ejector actuating mechanism.

16. In a coin handling machine, the combination of a plate adapted to control the delivery of coins, means including a setting lever adapted to adjust the plate, means including a bank of keys to readjust the control plate, coin ejectors rendered selectively operable by said control plate, ejector actuating mechanism to actuate the selected ejectors, and interlocking means comprising an element operable by said lever, an element operable by said keys and a member connected to said ejector actuating mechanism, said elements coacting with said member to prevent the movement of the ejector actuating mechanism until the plate has been fully adjusted.

17. In a coin handling machine, the combination of a plate adapted to control the delivery of coins, ejectors rendered selectively operable by said control plate, ejector actuating mechanism to actuate the selected ejectors, setting levers for directly adjusting said control plate, and means operated by the ejector actuating means and cooperable with the setting levers for preventing movement of the setting levers when the ejector actuating mechanism is partially operated.

18. In a machine of the class described, the combination of a plate adapted to control the delivery of coins, coin delivery mechanism, means including keys adapted to adjust said plate, and an interlocking means comprising a member operated by said key and a member operated by said coin delivery mechanism, the coaction between said members being such that if either is operated the other is blocked, whereby the simultaneous operation of the keys and the coin delivery mechanism is prevented.

19. In a machine of the class described, the combination of a units and a tens lever operable to represent an amount received; a plurality of members each actuated by one of said levers; a units and a tens control plate, each adjustable by its respective member; a plurality of ejectors adapted to be selected for operation by the adjusted plates; a series of keys operable to represent an amount of a sale; means whereby said keys readjust the plates to render other ejectors operative; and means for operating the ejectors which have been rendered operative by the control plates in their final positions.

20. In a change making machine, the combination of a tens setting lever, a tens denominational control plate, adjusting means operable by the tens setting lever to directly adjust the tens denomination control plate, a units setting lever, a units control plate, adjusting means operable by the units setting lever to directly adjust the units control plate, a bank of tens keys, means operated by said keys to move the adjusting means for the tens control plate to readjust said plate, a bank of units keys, means operated by the units keys to move the adjusting means for the units control plate to readjust said plate, said units control plate adjusting means having means cooperable therewith to further adjust the tens control plate, whereby the final adjustment of the control plates will correspond to the difference between the amount represented by the setting levers and that represented by the operated keys, a plurality of ejectors selected for operation by the units and tens control plates, and separately operable means for actuating the selected ejectors.

21. In a change making machine, the combination of a tens setting lever, a tens denominational control plate, adjusting means controlled by said tens setting lever for moving the tens denomination control plate, a units setting lever, a units control plate, adjusting means controlled by said units setting lever for moving the units control plate, a bank of tens keys, means operated by said tens keys to control the adjusting means for the tens denominational control plate, a bank of units keys, means operated by the units keys to control the adjusting means for the units control plate, means cooperating with the units control plate adjusting means to move the tens denomination control plate to effect subtractive transfers, means cooperating with the units control plate adjusting means to shift the tens denomination control plate when said units control plate adjusting means occupies predetermined positions whereby the final setting of said two plates will correspond to the difference between the amount represented by said levers and that represented by the operated keys, a plurality of coin ejectors cooperatively associated with said control plates and adapted to be rendered selectively operable thereby, and manually operable means for operating the coin ejectors which have been rendered operable by the plates.

22. In a machine of the class described, the combination of a tens control plate movable to control the ejection of coins in amounts which are even and odd multiples of five, a units control plate, means for setting the units control plate, and means controlled by said setting means for causing another movement of the tens control plate to control the ejection of change amounts which differ in value from the change amounts that would have been ejected previous to the latter movement of the tens control plate.

23. In a coin handling machine, the combination of means settable to a plurality of positions, a control plate positioned under control of said means and adapted to control the delivery of coins, a plurality of coin ejectors rendered selectively operable by the adjustment of said plate, means actuated independently of said levers and operable to operate the selected ejectors, and a locking means actuated by the settable means when it is out of one of said positions and effective to prevent the operation of said ejector operating means.

24. In a machine of the class described, a lever settable to indicate an amount tendered, a set of keys operable to set up an amount of a sale, and a coin selector plate controlled in its setting by the lever and keys, said lever and plate remaining in their set positions until operated to set up a problem involving a different amount tendered and a different amount of a sale.

25. In a machine of the class described, the combination of a manually operable means for setting up amounts received, manually operable means for setting up amounts of sales, and a coin selecting control plate settable under control of both of said manually operable means, said manually operable means for setting up amounts tendered remaining in its adjusted position until manually shifted to set up another amount, said control plate remaining in its set position until it is operated by either of the manually operable means in setting up a problem involving different amounts.

26. In a machine of the class described, the combination of a lever settable to indicate amounts tendered; a coin selecting control plate settable under control of said lever; a key operated mechanism operable to set up amounts of sales, said mechanism including an element which remains set in position corresponding to the key depressed when the rest of the mechanism returns to normal position; and means operated by said element for readjusting said plate; the lever, element and plate remaining in their set positions until operated to set up a problem involving amounts different from those to which the settings correspond.

27. In a coin handling machine, the combination of a lever settable to indicate an amount tendered, a set of keys operable to set up an amount of sale, a differential means controlled by said keys, a member set differentially by the differential means, another member adjustable complementary thereto, operating means to cause the complementary movement of the second-named member, an element set differentially by the combined movements of the two members, and a coin selector plate controlled in its setting by the lever and the element, said lever and plate remaining in their set positions until operated to set up a problem involving a different amount tendered and a different amount of sale.

28. In a coin handling machine, the combination of a manually operable means for setting up amounts received, manipulative devices for setting up amounts of sales, a differential means controlled by the manipulative devices, complementary movable members controlled by the differential means, said complementary members connected together, a cam on one of the complementary members, an operating means coacting with the cam to adjust one of the complementary members according to the differential adjustment of the other complementary member, and a coin selecting control plate settable under the combined control of said manually operable means and the complementary movable members, said manually operable means for setting up amounts tendered remaining in its adjusted position until manually shifted to set up another amount, said control plate remaining in its set position until it is operated by either the manually operable means or the complementary members in setting up a problem involving different amounts.

29. In a coin handling machine, the combination of a lever settable to indicate an amount tendered, manipulative devices operable to set up an amount, a differential settable by the manipulative devices, non-coaxially pivoted members one member differentially adjusted by the differential, an operating means to adjust the other member a complementary distance in relation to the differentially adjusted member, and a coin selector plate controlled in its setting by the lever and the pivoted members, said lever and plate remaining in their set positions until operated to set up a problem involving a different amount tendered and a different amount of sale.

30. In a coin handling machine, the combination of a lever settable to indicate an amount tendered, manipulative devices operable to set up an amount, a differential settable by the manipulative devices, non-coaxially pivoted members connected together and operable under control of the differential, a cam slot on one of said members, operating mechanism coacting with the cam slot to adjust both members, a floating member adjustable by the combined movement of both members, and a coin selector plate controlled in its setting by the lever and the floating member, said lever and plate remaining in their set positions until operated to set up a problem involving a different amount tendered and a different amount of sale.

HELGE C. DIESERUD.